(12) United States Patent
Wu et al.

(10) Patent No.: US 8,630,307 B2
(45) Date of Patent: Jan. 14, 2014

(54) METHODS AND APPARATUS FOR TRAFFIC CONTENTION RESOURCE ALLOCATION

(75) Inventors: Xinzhou Wu, Monmouth Junction, NJ (US); Thomas J. Richardson, South Orange, NJ (US); Junyi Li, Chester, NJ (US); Sundar Subramanian, Somerville, NJ (US); Nilesh Khude, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 13/231,417

(22) Filed: Sep. 13, 2011

(65) Prior Publication Data

US 2013/0064089 A1 Mar. 14, 2013

(51) Int. Cl.
| | |
|---|---|
| H04L 12/413 | (2006.01) |
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl.
USPC .......... 370/447; 370/449; 370/461; 370/462; 370/235

(58) Field of Classification Search
USPC ......... 370/229, 232, 233, 234, 235, 236, 255, 370/447, 449, 461, 462
See application file for complete search history.

(56) References Cited

U.S. PATENT DOCUMENTS

| | | | |
|---|---|---|---|
| 6,747,953 B1 | 6/2004 | Qureshi et al. | |
| 7,068,601 B2 | 6/2006 | Abdelilah et al. | |
| 7,680,044 B2 | 3/2010 | Sumner et al. | |
| 2007/0025301 A1 | 2/2007 | Petersson et al. | |
| 2009/0016311 A1* | 1/2009 | Wu et al. | 370/342 |
| 2009/0135720 A1 | 5/2009 | Li et al. | |
| 2009/0232086 A1* | 9/2009 | Li et al. | 370/330 |
| 2009/0232142 A1* | 9/2009 | Li et al. | 370/395.3 |
| 2009/0232143 A1* | 9/2009 | Li et al. | 370/395.3 |
| 2010/0085973 A1* | 4/2010 | Li et al. | 370/395.3 |
| 2011/0087768 A1 | 4/2011 | Wu et al. | |
| 2013/0064089 A1* | 3/2013 | Wu et al. | 370/235 |

OTHER PUBLICATIONS

International Search Report and Written Opinion—PCT/US2012/055179—ISA/EPO—Dec. 17, 2012.
Wu, X., et al., "FlashLinQ: A synchronous distributed scheduler for peerto-peer ad hoc networks", Communication, Control, and Computing(Allerton), 2010 48th Annual Allerton Conference on, IEEE, Sep. 29, 2010, pp. 514-521, XP031899421, DOI: 10.1109/Allerton.2010.5706950, ISBN: 978-1-4244-8215-3.

\* cited by examiner

Primary Examiner — Benjamin H Elliott, IV
(74) Attorney, Agent, or Firm — James K. O'Hare

(57) ABSTRACT

Methods and apparatus for allocating traffic contention resource units in a wireless communications system in which decisions are made in a distributed manner are described. A wireless communications device, corresponding to a link, self allocates resource units for traffic contention. Decisions regarding initially acquiring resources, relinquishing acquired resources, and/or acquiring additional resources for traffic contention are based on detected levels of network congestion and/or detected changes in network congestion. A wireless communications device detects a level of network congestion and determines a number of resource units to acquire for traffic contention based on the detected level of network congestion.

20 Claims, 25 Drawing Sheets

METHODS AND APPARATUS FOR TRAFFIC CONTENTION RESOURCE ALLOCATION

FIELD

Various embodiments are directed to method and apparatus for allocating communications resource units, e.g., traffic contention resource units, in a wireless communications system.

BACKGROUND

In some time slotted peer to peer systems, dedicated resources are allocated for the purpose of the contention resolution for traffic transmission, e.g. during a connection scheduling phase. In some such systems, each link is assigned a fraction of such dedicated resources where transmit request and transmit request response signals are sent so that links in a neighborhood can contend for the use of traffic channels. The dedicated resources, which are portions of control channels and do not carry traffic data signals, are usually considered to be system overhead. How to tightly control the use of resources used for contention resolution for traffic transmission is a problem for such peer to peer systems.

In some peer to peer systems, a connection identifier (CID) corresponds to a resource unit in the traffic contention resources for every traffic transmission slot. In some such systems, the physical location of the resource unit in the traffic contention resources corresponding to a CID may, and sometimes does, change over time to allow permutation of instantaneous priorities in contention. In some systems, a CID channel is provided to help users acquire a locally unique CID by enforcing existing links to indicate their presence thereby allowing the user device to identify and acquire an unused CID. When a new link attempts to join the system but only finds out no unique CID is available, the new link might get rejected of the channel use until next attempt.

In this design approach, the total amount of resource units for traffic contention corresponds to the size of the CID space, which corresponds to the resource units required to support the maximum number of contending links permitted in the system in a neighborhood. A larger CID space facilitates a lower call block rate, but on the other hand, more overhead for the traffic contention channel. In a peer to peer system at different times different numbers of wireless devices may desire to contend for traffic resources. The amount of traffic resources that a particular wireless device in a peer to peer system may need may be expected to vary over time. In addition different wireless devices and/or different types of wireless devices may have different traffic resource needs.

In view of the above, it should be appreciated there is a need for flexible methods of contention for traffic resources in a peer to peer network.

SUMMARY

Various embodiments are directed to methods and apparatus for allocating traffic contention resource units in a wireless communications system. The traffic contention resource units may be, e.g., one or more tone-symbols within a slot of a traffic control channel. Various methods and apparatus are well suited for use in a peer to peer wireless communications system, e.g., a peer to peer wireless system in which network congestion level can be expected to vary and in which decisions are made in a distributed manner. In some such embodiments, a wireless communications device, corresponding to a link, self allocates resource units for traffic contention, e.g. through acquiring and relinquishing CIDs. Note that in some but not all embodiments, each CID only corresponds to traffic contention units in a subset of the traffic slots, rather than all traffic slots. For example, in some but not all embodiments, a CID can only correspond to the traffic contention units in all even slots or all odd slots. Decisions regarding initially acquiring resources, relinquishing acquired resources, acquiring additional resources, and/or making changes in relative distributions of acquired resources for traffic contention are based on detected levels of network congestion and/or detected changes in network congestion.

An exemplary method of operating a wireless communications device, in accordance with some embodiments, comprises: detecting a level of network congestion; and determining a number of resource units to acquire for traffic contention based on the detected level of network congestion. An exemplary wireless communications device, in accordance with some embodiments, comprises: at least one processor configured to: detect a level of network congestion; and determine a number of resource units to acquire for traffic contention based on the detected level of network congestion. The exemplary wireless communications device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
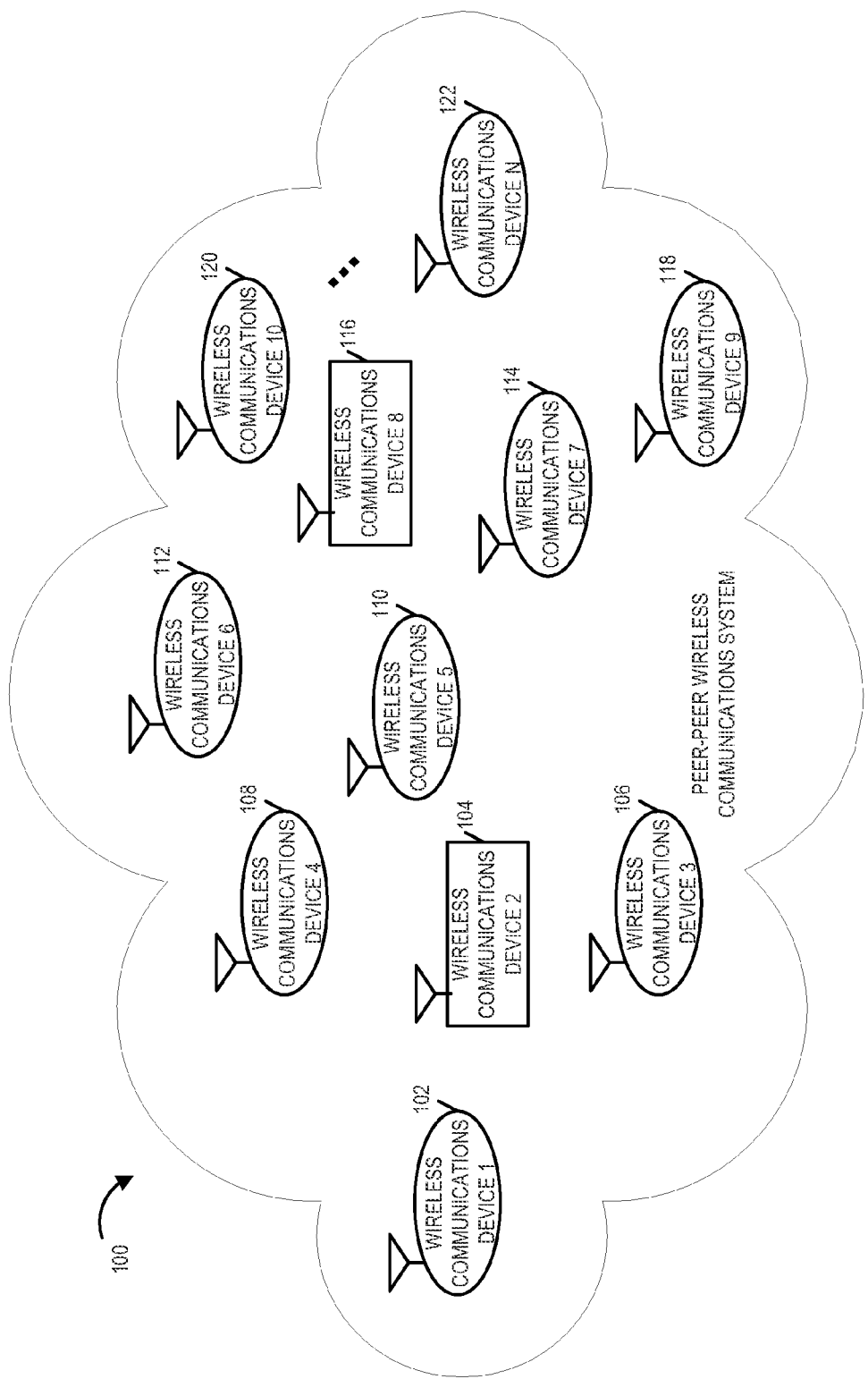
FIG. 1 is a drawing of an exemplary peer to peer wireless communications system in accordance with various exemplary embodiments.

FIG. 1 is a drawing of an exemplary peer to peer wireless communications system 100 in accordance with various exemplary embodiments. Exemplary peer to peer wireless communications system 100 includes a plurality of wireless communications devices (wireless communications device 1 102, wireless communications device 2 104, wireless communications device 3 106, wireless communications device 4 108, wireless communications device 5 110, wireless communications device 6 112, wireless communications device 7 114, wireless communications device 8 116, wireless communications device 9 118, wireless communications device 10 120, . . . , wireless communications device N 122) which support a peer to peer signaling protocol. Exemplary wireless communications devices (102, 106, 108, 110, 112, 114, 118, 120, 122) are mobile devices while wireless communications devices (104, 116) are stationary devices.

Wireless communications devices in system 100 may, and sometimes do, form peer to peer connections with one another. Wireless communications devices in system 100 self allocate and/or relinquish resource units for traffic contention based on a detected level of network congestion. At different times a wireless communications device corresponding to same peer to peer connection may hold a different amount of traffic contention resource units.

Figure 2A:
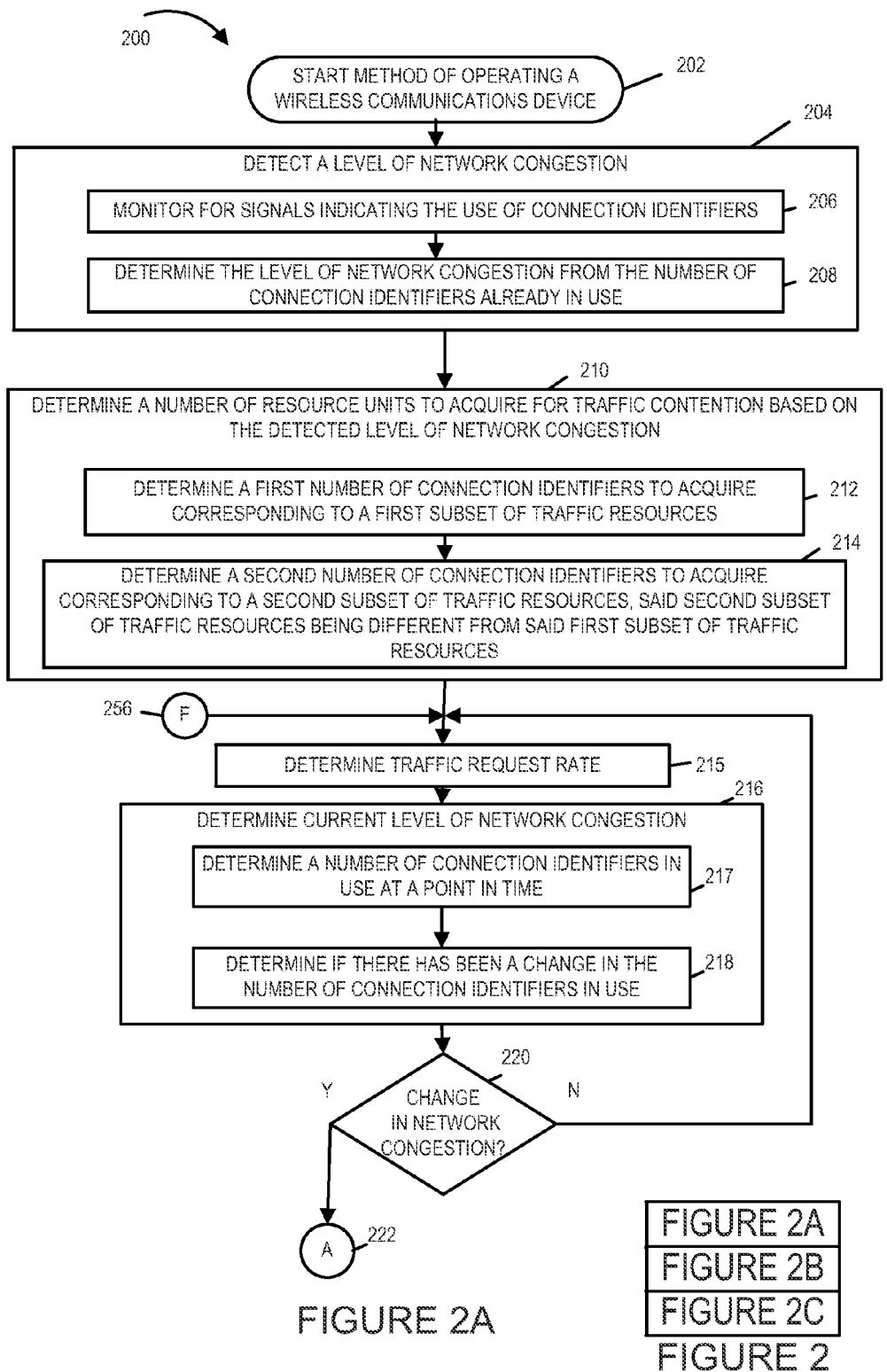
FIG. 2A is a first part of a flowchart of an exemplary method of operating a wireless communications device in accordance with various exemplary embodiments.
Figure 2B:
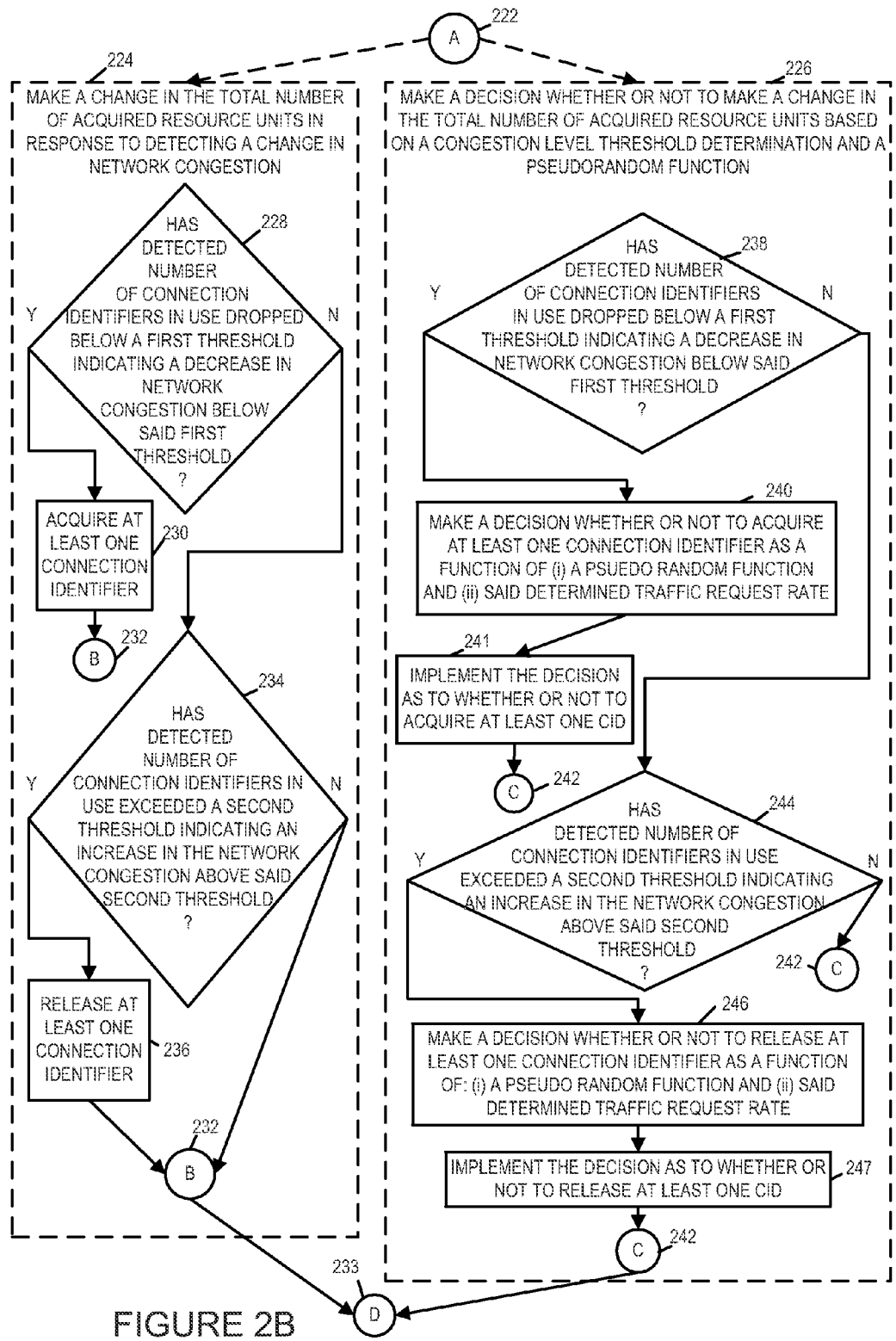
FIG. 2B is a second part of a flowchart of an exemplary method of operating a wireless communications device in accordance with various exemplary embodiments.
Figure 2C:
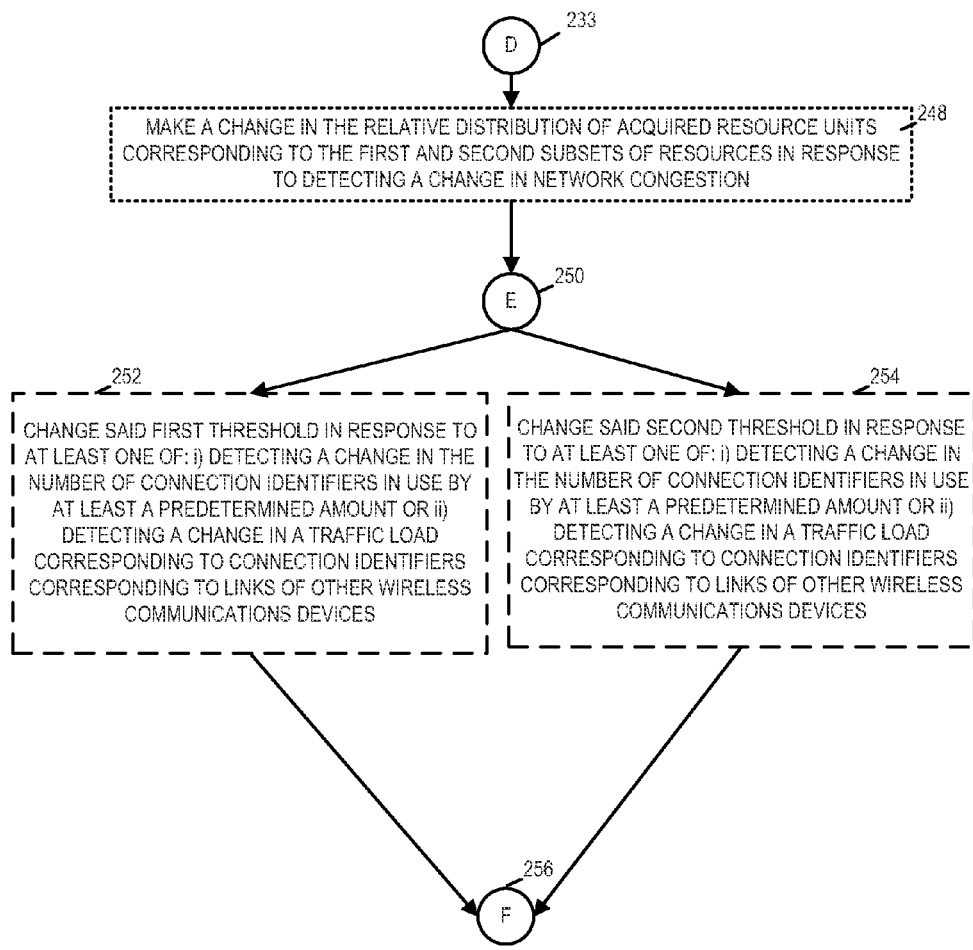
FIG. 2C is a third part of a flowchart of an exemplary method of operating a wireless communications device in accordance with various exemplary embodiments.

FIG. 2, comprising the combination of FIG. 2A, FIG. 2B and FIG. 2C, is a flowchart 200 of an exemplary method of operating a wireless communications device in accordance with various embodiments. Operation of the exemplary method starts in step 202 where the wireless communications device is powered on and initialized. Operation proceeds from start step 202 to step 204. In step 204 the wireless communications device detects a level of network congestion. Step 204 includes steps 206 and 208. In step 206 the wireless communications device monitors for signals indicating the use of connection identifiers, and then in step 208 the wireless communications device determines the level of network congestion from the number of connection identifiers already in use. Operation proceeds from step 204 to step 210.

In step 210 the wireless communications device determines a number of resource units to acquire based on at least the detected level of network congestion. In some embodiments one or more other factors are also used in determining the number of resource units to acquire. For example, in some embodiments, the nature of the traffic of the transmitter, e.g., traffic type such as voice or video or HTTP, etc., is used in determining the number of resource units to acquire. In some embodiments, the resource units are associated with connection identifiers which give the wireless communications device an opportunity to contend for traffic resources. In some embodiments, the resource units are connection identifiers which give the wireless communications device an opportunity to contend for traffic resources. In some embodiments, an individual connection identifier gives the wireless communications device an opportunity to contend for traffic resources corresponding to different subsets of traffic resources, at least some different connection identifiers correspond to different subsets of traffic resources. For example, in one embodiment a first set of connection identifiers corresponds to odd traffic slots and a second set of connection identifiers corresponds to even traffic slots. Step 210 includes steps 212 and 214. In step 212 the wireless communications device determines a first number of connection identifiers to acquire corresponding to a first subset of traffic resources. Operation proceeds from step 212 to step 214. In step 214 the wireless communications device determines a second number of connection identifiers to acquire corresponding to a second subset of traffic resources, said second subset of traffic resources being different from said first subset of traffic resources. In some embodiments, when a high level of network congestion is detected, a connection identifier corresponding to a single subset is selected and when a lower level of congestion is detected connection identifiers corresponding to multiple different subsets are detected. Operation proceeds from step 210 to step 215.

In step 215 the wireless communications devices determines its traffic request rate. In some embodiments, the traffic request rate is how many traffic transmission request signals the wireless communications device has transmitted over a given number of traffic slots. In some embodiments statistics for the traffic request rates for existing CIDs are collected and are used as an indication of how busy the contention is. This can be, and in some embodiments is, done by observing the occupancy in the link scheduling phase rather than observing occupancy in the CID broadcast channels. In some embodiments, traffic request rate statistics for existing CIDs are used in determining network congestion and/or making decisions regarding acquiring and/or relinquishing resources, e.g., CIDs. In some embodiments, an understanding of the nature of the traffic being carried in the link itself is used in determining network congestion and/or making decisions regarding acquiring and/or relinquishing resources, e.g., CIDs. In some embodiments, the type of traffic, e.g., voice or video, or HTTP, etc., being communicated on the links is observed, tracked and used in determining network congestion and/or making decisions regarding acquiring and/or relinquishing resources, e.g., CIDs. Operation proceeds from step 215 to step 216.

In step 216 the wireless communications device determines a current level of network congestion. Step 216 includes steps 217 and 218. In step 217 the wireless communications device determines a number of connection identifiers in use at a point in time, and then in step 218 the wireless communications device determines if there has been a change in the number of connection identifiers in use. In some embodiments, the wireless communications device compares the determined number of connection identifiers in use for a current point in time to the number of CIDs used in previous slots, i.e., the last time statistics were recorded from previous instances of CID channel. Operation proceeds from step 216 to step 220.

In step 220 the wireless communications device determines if there has been a change in network congestion, e.g., based on whether or not there has been a change in the number of connection identifiers in use. If the wireless communications determines that there has not been a change in network congestion, then operation proceeds from step 220 to step 215 for another determination of its traffic request rate and another determination of the current level of network congestion at a later point in time. However, if the wireless communications device determines in step 220 that there has been a change in the level of network congest then operation proceeds from step 220 via connecting node A 222 to one of step 224 and step 226. Step 224 and step 226 are alternative steps. In some embodiments, step 224 is used, while in other embodiments, step 226 is used. In still other embodiments, step 224 may be used during some iterations and step 226 used in other iterations.

In step 224 the wireless communications device makes a change in the total number of acquired resource units in response to detecting a change in network congestion. Step 224 includes steps 228, 230, 234 and 236. In step 228 the wireless communications device determines if the detected number of connection identifiers in use has dropped below a first threshold indicating a decrease in network congestion below said first threshold. If the wireless communications device determines that the detected number of connection identifiers has dropped below the first threshold, then operation proceeds from step 228 to step 230. In step 230, the wireless communications device acquires at least one connection identifier. Operation proceeds from step 230 to connecting node B 232. Returning to step 228, in step 228 if the wireless communications device has not detected that the number of connection identifiers in use has dropped below the first threshold, then operation proceeds from step 228 to step 234.

In step 234 the wireless communications device determines if the wireless communications device has detected that the number of connection identifiers in use has exceeded a second threshold indicating an increase in network congestion above said second threshold. If the wireless communications device determines that the number of connection identifiers in use has exceeded the second threshold, then operation proceeds from step 234 to step 236, in which the wireless communications device releases at least one connection identifier. Operation proceeds from step 236 to connecting node B 232. Returning to step 234, in step 234 if the wireless communications device determines that the detected number of connection identifiers in use has not exceeded the second threshold, then operation proceeds from step 234 to connecting node B 232.

Returning to step 226, in step 226 the wireless communications device makes a decision whether or not to make a change in the total number of acquired resource units based on a congestion level threshold determination and a pseudorandom function. Using this approach of making the change dependent of a pseudorandom function, e.g., a pseudorandom function in which different wireless communications devices use a different seed value, each of the wireless communications device which has detected the congestion change does not necessarily change the same way in response to the detected congestion change. Step 226 includes steps 238, 240, 244 and 246. In step 238 the wireless communications device determines if the detected number of connection identifiers in use has dropped below a first threshold indicating a decrease in network congestion below said first threshold. If the wireless communications device determines that the detected number of connection identifiers has dropped below the first threshold, then operation proceeds from step 238 to step 240 where the wireless communications device makes a decision whether or not to acquire at least one connection identifier as a function of: (i) a pseudorandom function and (ii) said determined traffic request rate. The use of the pseudorandom function tends to prevent each of the wireless communications devices acting in the same manner at a particular time in response to the same detected change in network congestion. For example the pseudorandom function can be used to prevent a larger number of wireless devices from concurrently acquiring an additional connection identifier in response to a change in network congestion, thus moderating change in the peer to peer system. The use of determined traffic request rate information in the decision whether or not to acquire an additional connection identifier is used to favor wireless communications devices with high traffic request rates over wireless communications devices with low traffic request rate in deciding which devices get to acquire an addition connection identifier.

Operation proceeds from step 240 to step 241 where the wireless communications device implements the decision of step 240 as to whether or not to acquire at least one connection identifier. Step 241 may, and sometimes does, include acquiring an additional connection identifier. Operation proceeds from step 241 to connecting node C 242.

Returning to step 238, in step 238 if the wireless communications device has not detected that the number of connection identifiers in use has dropped below the first threshold, then operation proceeds from step 238 to step 244.

In step 244 the wireless communications device determines if the wireless communications device has detected that the number of connection identifiers in use has exceeded a second threshold indicating an increase in network congestion above said second threshold. If the wireless communications device determines that the number of connection identifiers in use has exceeded the second threshold, then operation proceeds from step 244 to step 246, in which the wireless communications device makes a decision whether or not to release at least one connection identifier as a function of: (i) a pseudorandom function and (ii) said determined traffic request rate. The use of the pseudorandom function tends to prevent each of the wireless communications devices acting in the same manner at a particular time in response to the same detected change in network congestion. For example the pseudorandom function can be used to prevent a larger number of wireless devices from concurrently releasing an acquired connection identifier in response to a change in network congestion, thus moderating change in the peer to peer system. The use of determined traffic request rate information in the decision whether or not to acquire an additional connection identifier is used to favor wireless communications devices with low traffic request rates over wireless communications devices with high traffic request rate in deciding which devices are to relinquish a connection identifier.

Operation proceeds from step 246 to step 247. In step 247 the wireless communications device implements the decision of step 246 as to whether or not to release at least one connection identifier. Step 247 may, and sometimes does, include releasing at least one connection identifier. Operation proceeds from step 247 to connecting node C 242.

Returning to step 244, in step 244 if the wireless communications device determines that the detected number of connection identifiers in use has not exceed the second threshold, then operation proceeds from step 244 to connecting node C 242.

Operation proceeds from connecting node B 232 or connecting node C 242 to step 248 via connection node D 233. In step 248 the wireless communications device makes a change in the relative distribution of acquired resource units corresponding to the first and second subsets of resources in response to detecting a change in network congestion. Operation proceeds from step 248 via connecting node E 250 to step 252 and step 254.

In step 252, the wireless communications device changes said first threshold in response to at least one of: i) detecting a change in the number of connection identifiers in use by at least a predetermined amount or ii) detecting a change in the traffic load corresponding to connection identifiers corresponding to links of other wireless communications devices. In step 254, the wireless communications device changes said second threshold in response to at least one of: i) detecting a change in the number of connection identifiers in use by at least a predetermined amount or ii) detecting a change in the traffic load corresponding to connection identifiers corresponding to links of other wireless communications devices. Operation proceeds from steps 252 and 254 via connecting node F 256 to step 215.

In some embodiments, the wireless communications device tests as to whether or not it should acquire or release a connection identifier at a higher rate than the wireless communications device updates first and second threshold values. Thus in some embodiments, steps 224 or 226 are performed at a higher rate than steps 252 and 254. In some embodiments, the rate of determining whether or not to acquire or release a connection identifier is at least 10 times the rate of updating the first and second thresholds. In some such embodiments, the rate of determining whether or not to acquire or release a connection identifier is at least 100 times the rate of updating the first and second thresholds.

Figure 3:
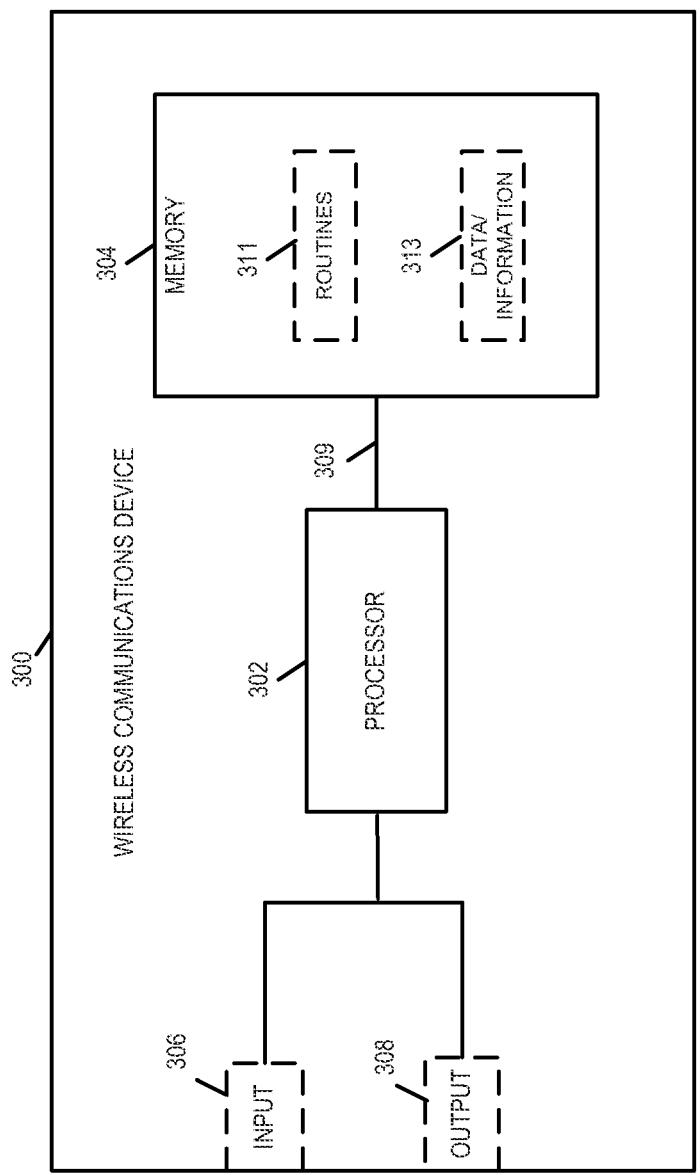
FIG. 3 is a drawing of an exemplary wireless communications device in accordance with an exemplary embodiment.

FIG. 3 is a drawing of an exemplary wireless communications device 300 in accordance with an exemplary embodiment. Exemplary wireless communications device 300 is, e.g., one of the wireless communications devices of system 100 of FIG. 1. Wireless communications device 300 is, e.g., a wireless communications device which supports a peer to peer signaling protocol. Exemplary wireless communications device 300 may, and sometimes does, implement a method in accordance with flowchart 200 of FIG. 2.

Wireless communications device 300 includes a processor 302 and memory 304 coupled together via a bus 309 over which the various elements (302, 304) may interchange data and information. Wireless communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output. In some embodiments, memory 304 includes routines 311 and data/information 313.

In various embodiments, processor 302 is configured to detect a level of network congestion and determine a number of resource units to acquire for traffic contention based on the detected level of network congestion. In some embodiments, the resource units are connection identifiers which give the wireless communications device an opportunity to contend for traffic resources. In some such embodiments, an individual connection identifier gives the wireless communications device an opportunity to contend for traffic resources corresponding to a particular subset of traffic resources, and at least some different connection identifiers correspond to different subsets of traffic resources. In various embodiments, processor 302 is configured to: monitor for signals indicating the use of connection identifiers; and determine the level of network congestion from the number of connection identifiers already in use, as part of being configured to detect a level of network congestion.

Processor 302, in some embodiments, is configured to: determine a first number of connection identifiers to acquire corresponding to a first subset of traffic resources; and determine a second number of connection identifiers to acquire corresponding to a second subset of traffic resources, said second subset of traffic resources being different from said first subset of traffic resources, as part of being configured to determine a number of connection identifiers to acquire. In some embodiments, processor 302 is configured to: select a connection identifier corresponding to a single subset when a high level of congestion is detected; and select connection identifiers corresponding to multiple different subsets when a lower level of congestion is detected.

In various embodiments, processor 302 is configured to: make a change in the total number of acquired resource units in response to detecting a change in network congestion. In some embodiments, processor 302 is configured to: make a decision whether or not to make a change in the total number of acquired resource units based on a congestion level threshold determination and a pseudorandom function. In some embodiments, processor 302 is configured to: make a change in the relative distribution of acquired resource units corresponding to the first and second subsets of resources in response to detecting a change in network congestion.

In various embodiments, processor 302 is configured to acquire at least one additional connection identifier, when said change in network congestion includes the detected number of connection identifiers in use dropping below a first threshold indicating a decrease in network congestion below said first threshold. In some embodiments, processor 302 is configured to release at least one connection identifier, when said change in network congestion includes the detected number of connection identifiers in use exceeding a second threshold indicating an increase in network congestion above said second threshold.

In some embodiments, processor 302 is configured to: determine a number of connection identifiers in use at a point in time; and determine if there has been a change in the number of connection identifiers in use. In some such embodiments, processor 302 is further configured to change a first threshold in response to at least one of: i) detecting a change the number of connection identifiers in use by at least a predetermined amount or ii) detecting a change in a traffic load corresponding to connection identifiers corresponding to links of other wireless communications devices. In some embodiments, processor 302 is configured to change a second threshold in response to at least one of: i) detecting a change the number of connection identifiers in use by at least a predetermined amount or ii) detecting a change in a traffic load corresponding to connection identifiers corresponding to links of other wireless communications devices.

Figure 4A:
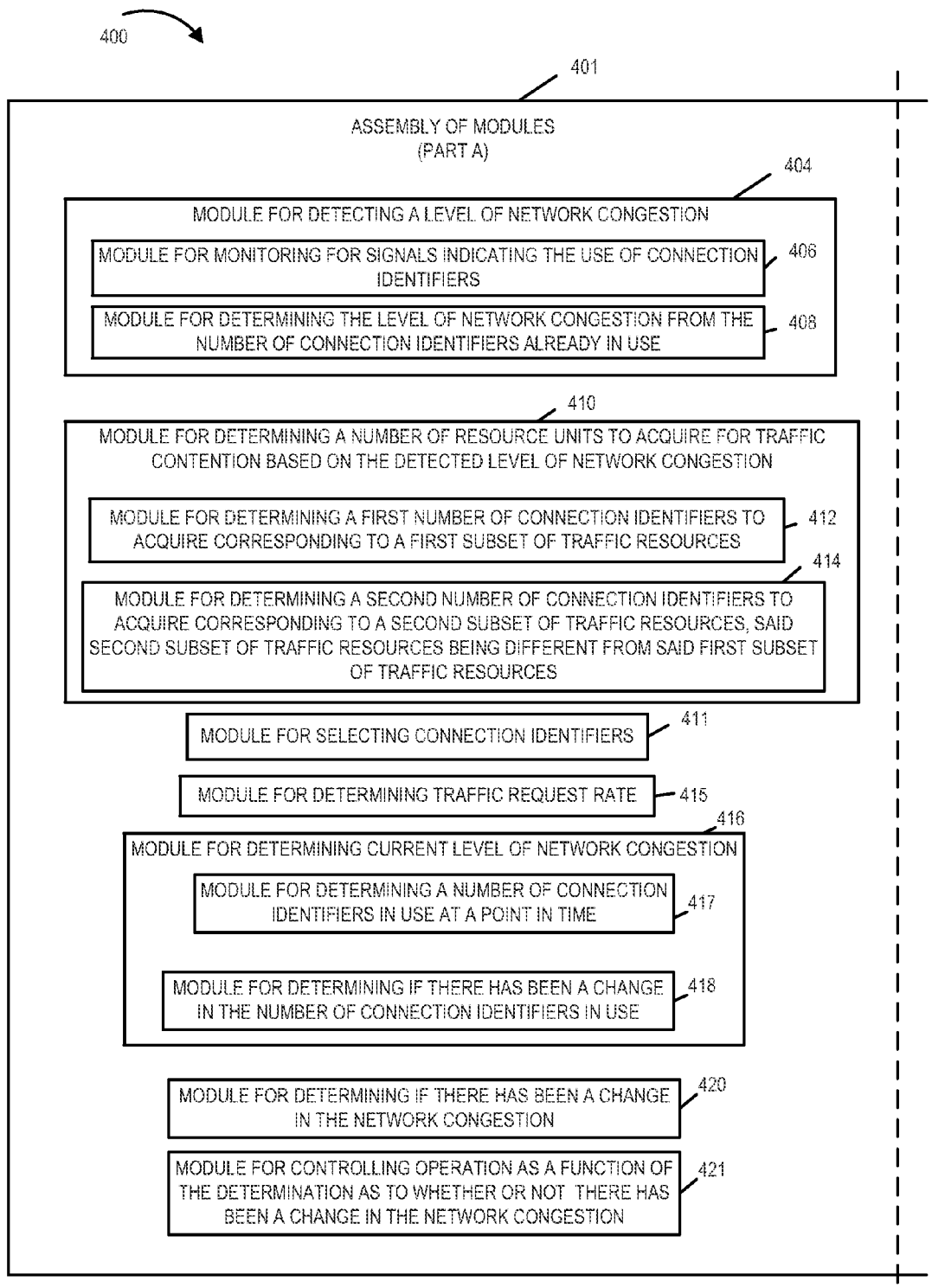
FIG. 4A is a first portion of an assembly of modules which can be, and in some embodiments is, used in the exemplary wireless communications device illustrated in FIG. 3.
Figure 4B:
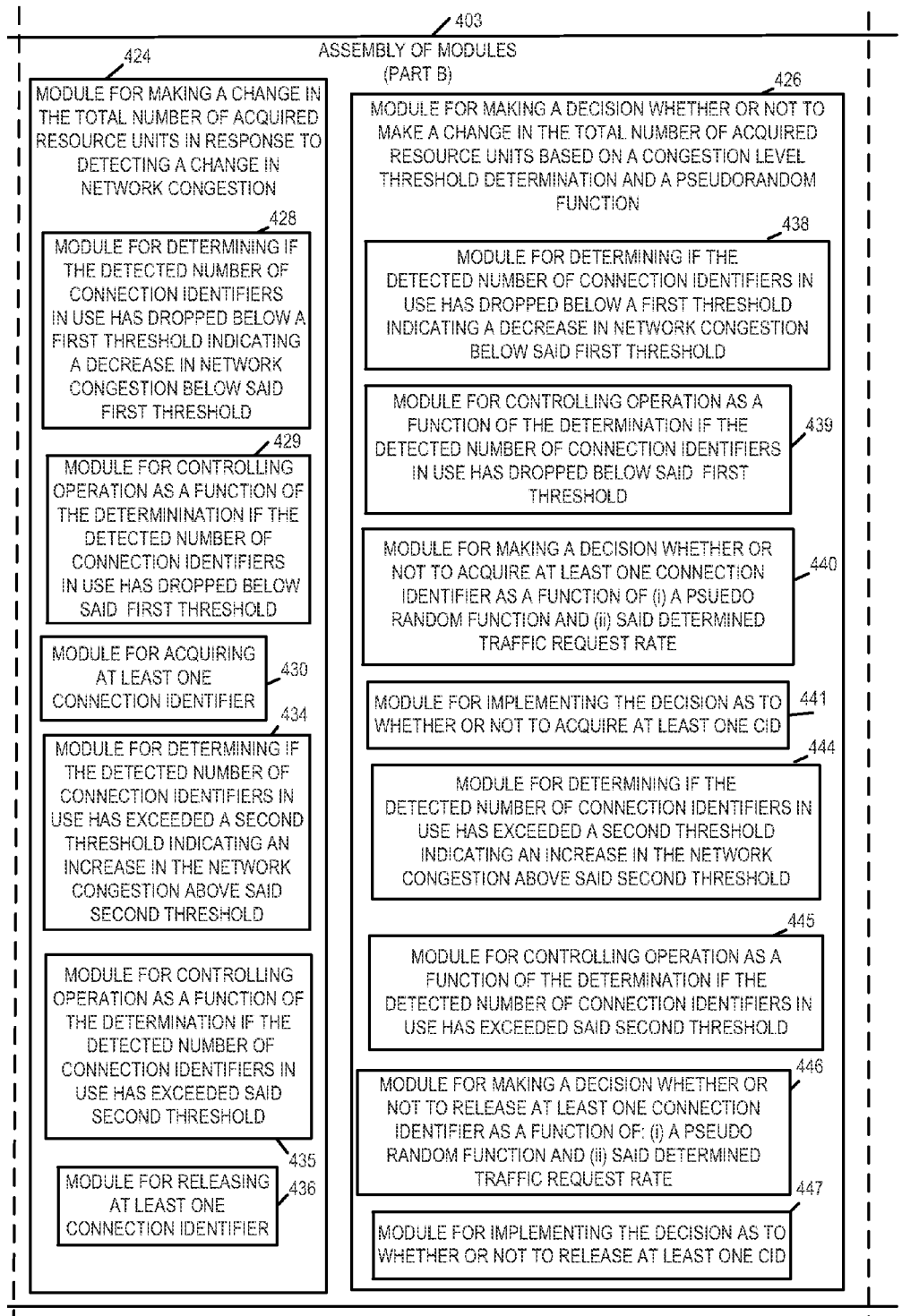
FIG. 4B is a second portion of an assembly of modules which can be, and in some embodiments is, used in the exemplary wireless communications device illustrated in FIG. 3.
Figure 4C:
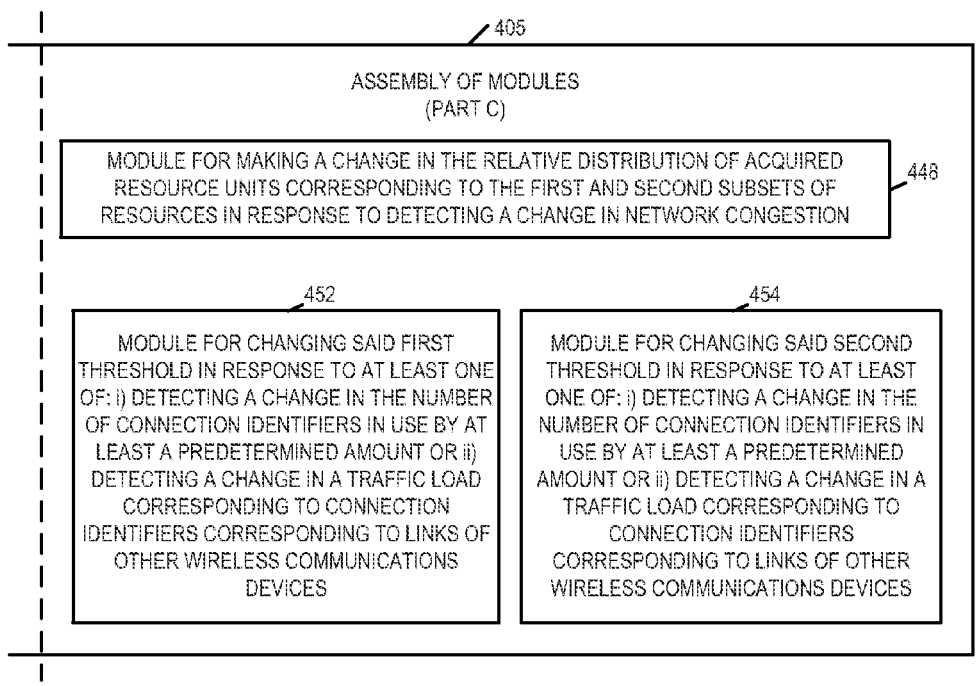
FIG. 4C is a third portion of an assembly of modules which can be, and in some embodiments is, used in the exemplary wireless communications device illustrated in FIG. 3.
Figure 4:
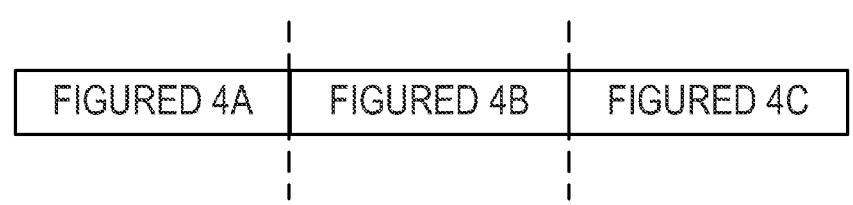

FIG. 4 is an assembly of modules 400 which can, and in some embodiments is, used in the exemplary wireless communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of wireless communications device 300 shown in FIG. 3. In some such embodiments, the assembly of modules 400 is included in routines 311 of memory 304 of device 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the wireless communications device 300 or elements therein such as the processor 302, to perform the functions of the corresponding steps illustrated and/or described in the method of flowchart 200 of FIG. 2.

Assembly of modules 400 includes the combination of part A 401, part B 403 and part C 405. Assembly of modules 400 includes a module for detecting a level of network congestion 404, a module for determining a number of resource units to acquire for traffic contention based on the detected level of network congestion 410, a module for selecting connection identifiers 411, a module for determining traffic request rate 415, a module for determining the current level of network congestion 416, a module for determining if there has been a change in the level of network congestion 420, and a module for controlling operation as a function of the determination as to whether or not there has been a change in the level of network congestion 421. Module 404 includes a module for monitoring for signals indicating the use of connection identifiers 406 and a module for determining the level of network congestion from the number of connection identifiers already in use 408. Module 410 includes a module for determining a first number of connection identifiers to acquire corresponding to a first subset of traffic resources 412 and a module for determining a second number of connection identifiers to acquire corresponding to a second subset of traffic resources, said second subset of traffic resources being different from said first subset of traffic resources 414. In some embodiments, when a high level of congestion is detected, said module for selecting connection identifiers 411 selects a connection identifier corresponding to a single subset and when a lower level of congestion is detected said module for selecting connection identifiers 411 selects connection identifiers corresponding to multiple different subsets. Module 416 includes a module for determining a number of connection identifiers in use at a point in time 417 and a module for determining if there has been a change in the number of connection identifiers in use 418.

Assembly of modules 400 further includes a module for making a change in the total number of acquired resource units in response to detecting a change in network congestion 424, a module for making a decision whether or not to make a change in the total number of acquired resource units based on a congestion threshold determination and a pseudorandom function 426, and a module for making a change in the relative distribution of acquired resource units corresponding to the first and second subsets of resources in response to detecting a change in network congestion 448. Module 424 includes a module for determining if the detected number of connection identifiers in use has dropped below a first threshold indicating a decrease in network congestion below said first threshold 428, a module for controlling operation as a function of the determination if the detected number of connection identifiers in use has dropped below said first threshold 429, a module for acquiring at least one connection identifier 430, a module for determining if the detected number of connection identifiers in use has exceeded a second threshold indicating an increase in the network congestion above said second threshold 434, a module for controlling operation as a function of the determination if the detected number of connection identifiers in use has exceeded said second threshold 435 and a module for releasing at least one connection identifier 436. Module 426 includes a module for determining if the detected number of connection identifiers in use has dropped below a first threshold indicating a decrease in network congestion below said first threshold 438, a module for controlling operation as a function of the determination if the detected number of connection identifiers in use has dropped below said first threshold 439, a module for making a decision whether or not to acquire at least one connection identifier as a function of: i) a pseudorandom function and ii) said determined traffic request rate 440, a module for implementing the decision as to whether or not to acquire at least one connection identifier 441, a module for determining if the detected number of connection identifiers in use has exceeded a second threshold indicting an increase in the network congestion above said second threshold 444, a module for controlling operation as a function of the determination if the detected number of connection identifiers in use has exceeded said second threshold 445 and a module for making a decision whether or not to release at least one connection identifier as a function of: i) a pseudorandom function and ii) said determined traffic rate request 446, and a module for implementing the decision as to whether or not a release at least one connection identifier 447. Module 441 can, and sometimes does, acquire at least one connection identifier. Module 441 determines which connection identifier or identifier to acquire when acquiring connection identifiers. Module 447 can, and sometimes does, release at least one connection identifier. Module 441 determines which connection identifier or identifier to release when releasing connection identifiers.

Assembly of modules 400 further includes a module for changing said first threshold in response to at least one of: i) detecting a change in the number of connection identifiers in use by at least a predetermined amount or ii) detecting a change in a traffic load corresponding to connection identifiers corresponding to links of other wireless communications devices 452 and a module for changing said second threshold in response to a least one of: i) detecting a change in the number of connection identifiers in use by at least a predetermined amount or ii) detecting a change in a traffic load corresponding to connection identifiers corresponding to links of other wireless communications devices 454.

In some embodiments, resource units are connection identifiers which give the wireless communications device an opportunity to contend for traffic resources. In some such embodiments, an individual connection identifier gives the wireless communications device an opportunity to contend for traffic resources corresponding to a particular subset of traffic resources, and at least some different connection identifiers corresponding to different subsets of traffic resources. In some embodiments, when a high level of network congestion is detected, a connection identifier corresponding to a single subset is selected, and when a lower level of congestion is detected connection identifiers corresponding to multiple different subsets are selected.

Figure 5:
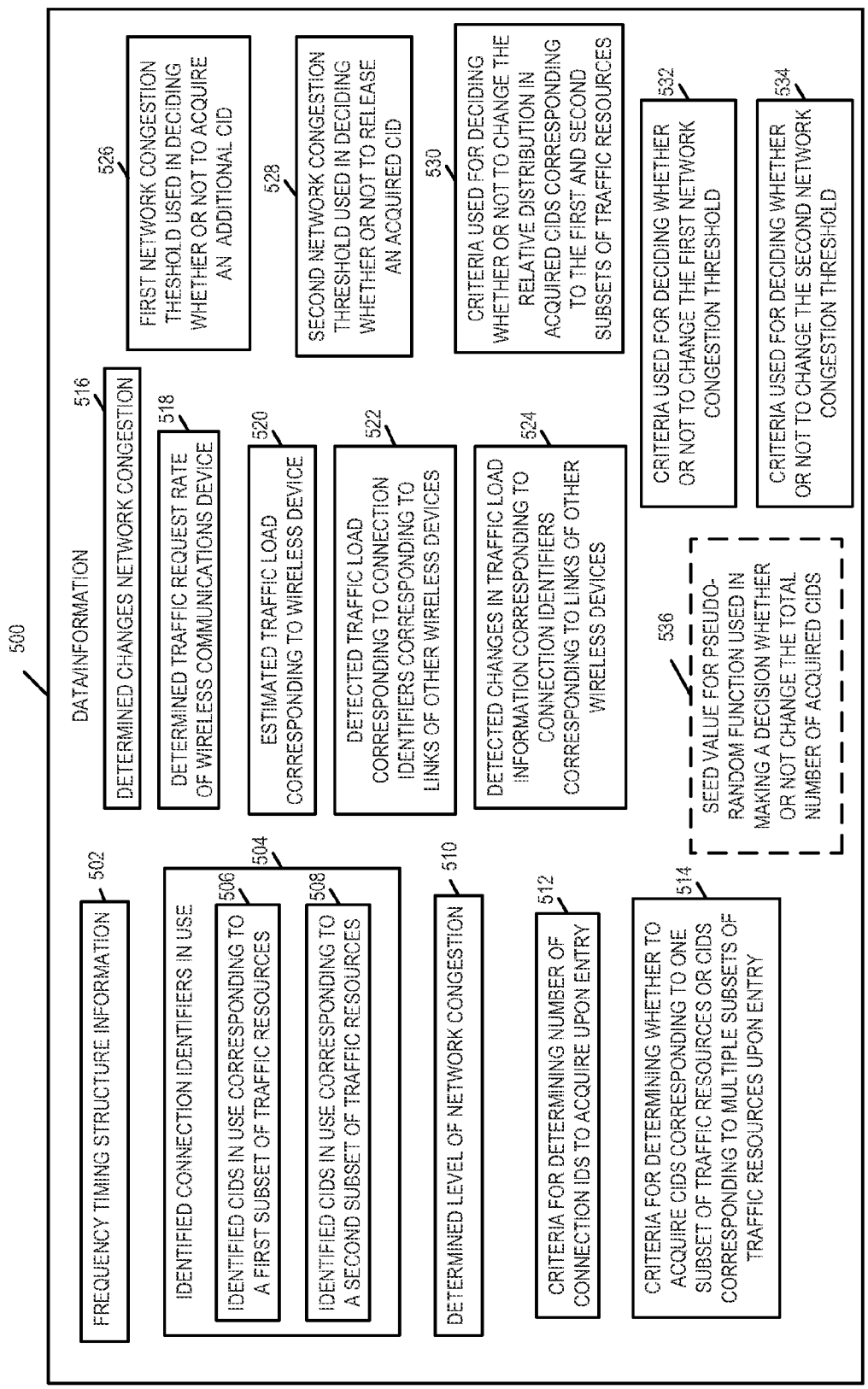
FIG. 5 is a drawing of exemplary data/information which can, and in some embodiments is, used in the exemplary wireless communications device illustrated in FIG. 3.

FIG. 5 is a drawing of exemplary data/information 500 in accordance with some embodiments. Exemplary data/information 500 is, e.g., included in data/information 313 of memory 304 of wireless communications device 300 of FIG. 3. Data/information 500 includes frequency timing structure information 502, identified connection identifiers in use 504, determined level of network congestion 510, criteria for determining the number of connection IDs to acquire upon entry 512, criteria for determining whether to acquired CIDs corresponding to one subset of traffic resources or CIDs corresponding to multiple subsets of traffic resources upon entry 514, determined changes in network congestion 516, determined traffic request rate of the wireless communications device 518, estimated traffic load corresponding to the wireless communications device 520, detected traffic load corresponding to connection identifiers corresponding to links of other wireless communications devices 522, and detected changes in traffic load information corresponding to connection identifiers corresponding to links of other wireless communications devices 524. Identified connection identifiers in use 504 includes identified connection identifiers in use corresponding to a first subset of traffic resources 506 and identified connection identifiers in use corresponding to a second subset of traffic resources 508.

Data/information 500 further includes first network congestion threshold used in deciding whether or not to acquire an additional CID 526, a second network congestion threshold used in deciding whether or not to release an acquired CID 528, and criteria used for deciding whether or not to change the relative distribution in acquired CIDS corresponding to the first and second subsets of traffic resources 530, criteria used for deciding whether or not to change the first network congestion threshold 532, and criteria used for deciding whether or not to change the second network congestion threshold 534. In some embodiments, data/information 500 includes a seed value for a pseudo random function used in making a decision whether or not the change the total number of acquired CIDs 536.

Figure 6:
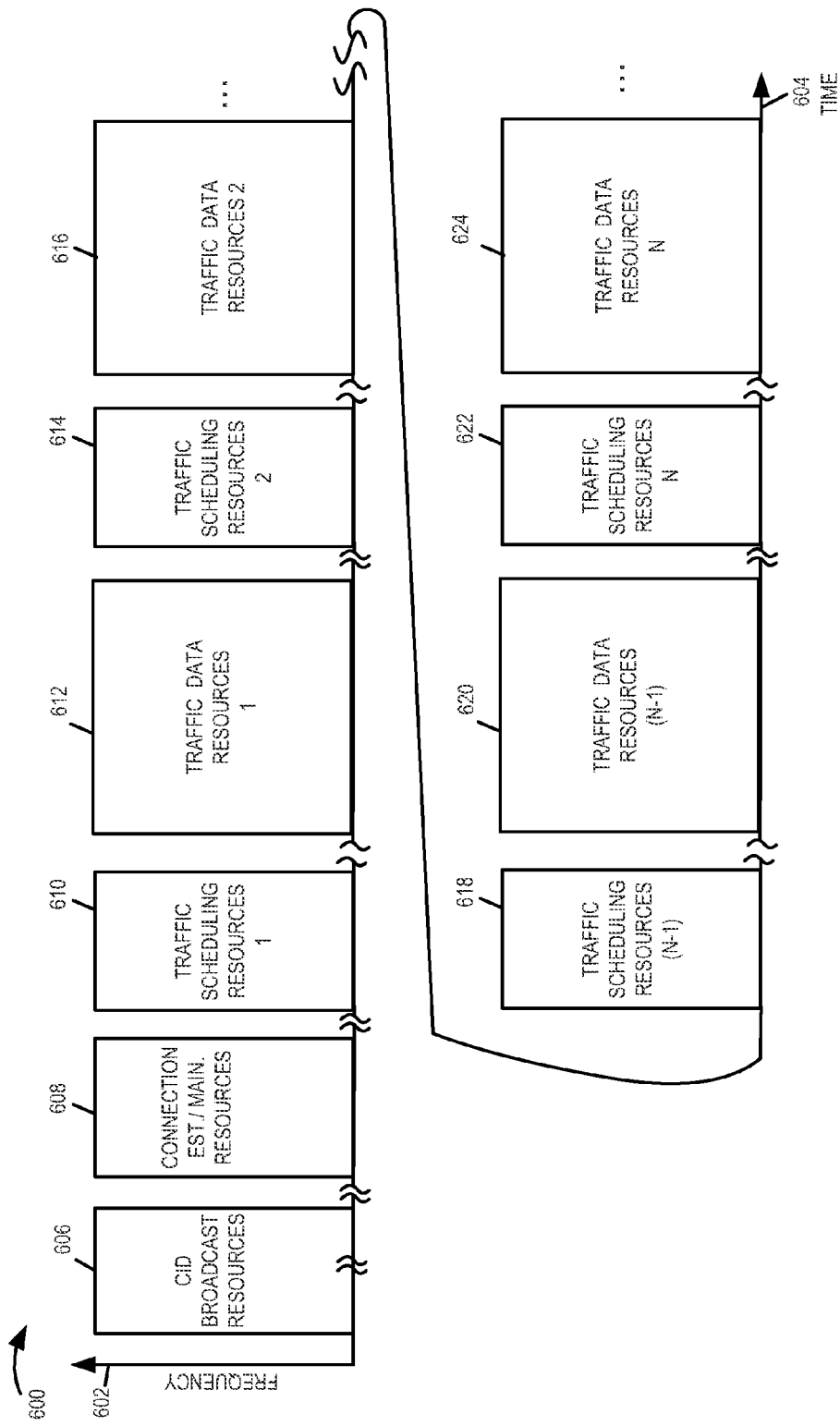
FIG. 6 is a drawing of a plot of an exemplary recurring peer to peer frequency/timing structure in accordance with various embodiments.

FIG. 6 is a drawing 600 of a plot of an exemplary recurring peer to peer frequency/timing structure in accordance with various embodiments. The peer to peer frequency/timing structure of FIG. 6 may, e.g., be represented by frequency timing structure information 502 of data/information 500 FIG. 5. Drawing 600 includes a vertical axis 602 representing frequency, e.g., OFDM tones, and a horizontal axis 604 representing time, e.g., OFDM symbol transmission time intervals, in a recurring timing structure.

The exemplary recurring frequency/timing structure includes connection identifier (CID) broadcast resources 606 and connection establishment/maintenance resources 608. The exemplary recurring frequency/timing structure further includes a plurality of sets of traffic scheduling resources and corresponding traffic data resources ((traffic scheduling resources 1 610, traffic data resources 1 612), (traffic scheduling resources 2 614, traffic data resources 2 616), . . . , (traffic scheduling resources (N−1) 618, traffic data resources (N−1) 620), (traffic scheduling resources N 622, traffic data resources N 624).

Figure 7:
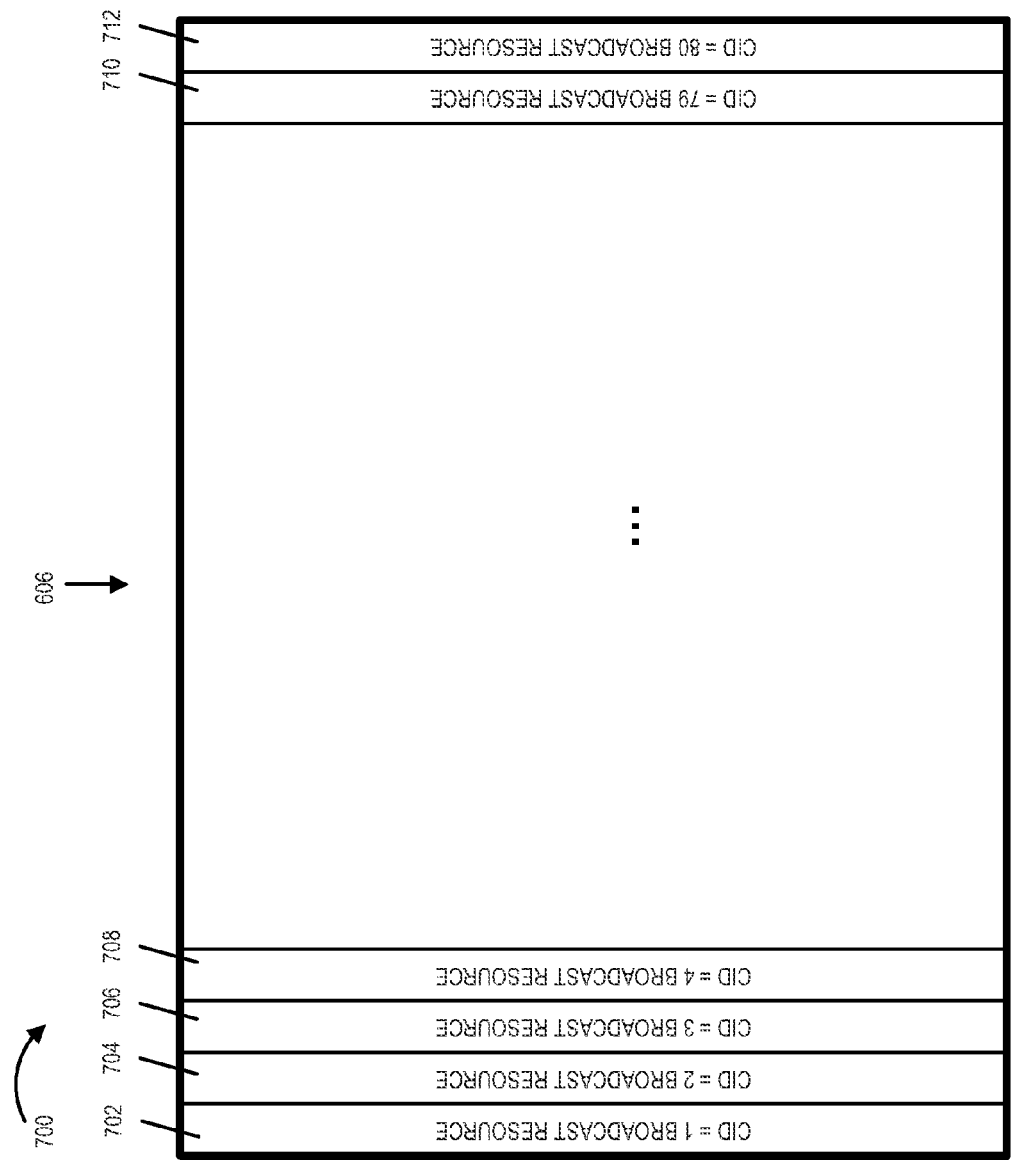
FIG. 7 is a drawing illustrating a more detailed representation of exemplary CID broadcast resources in accordance with an exemplary embodiment.

FIG. 7 is a drawing 700 illustrating a more detailed representation of CID broadcast resources 606 in accordance with an exemplary embodiment. In this example CID broadcast resource 606 includes an individual resource corresponding to each of the connection identifiers used in the recurring peer to peer frequency timing structure (CID=1 broadcast resource 702, CID=2 broadcast resource 704, CID=3 broadcast resource 706, CID=4 broadcast resource 708, . . . , CID=79 broadcast resource 710, CID=80 broadcast resource 712). A wireless communications device, which has acquired a CID, broadcasts a signal using the CID broadcast resource corresponding to its acquired CID. This announces to other wireless communications devices in its vicinity that the particular CID is currently in use.

Figure 8:
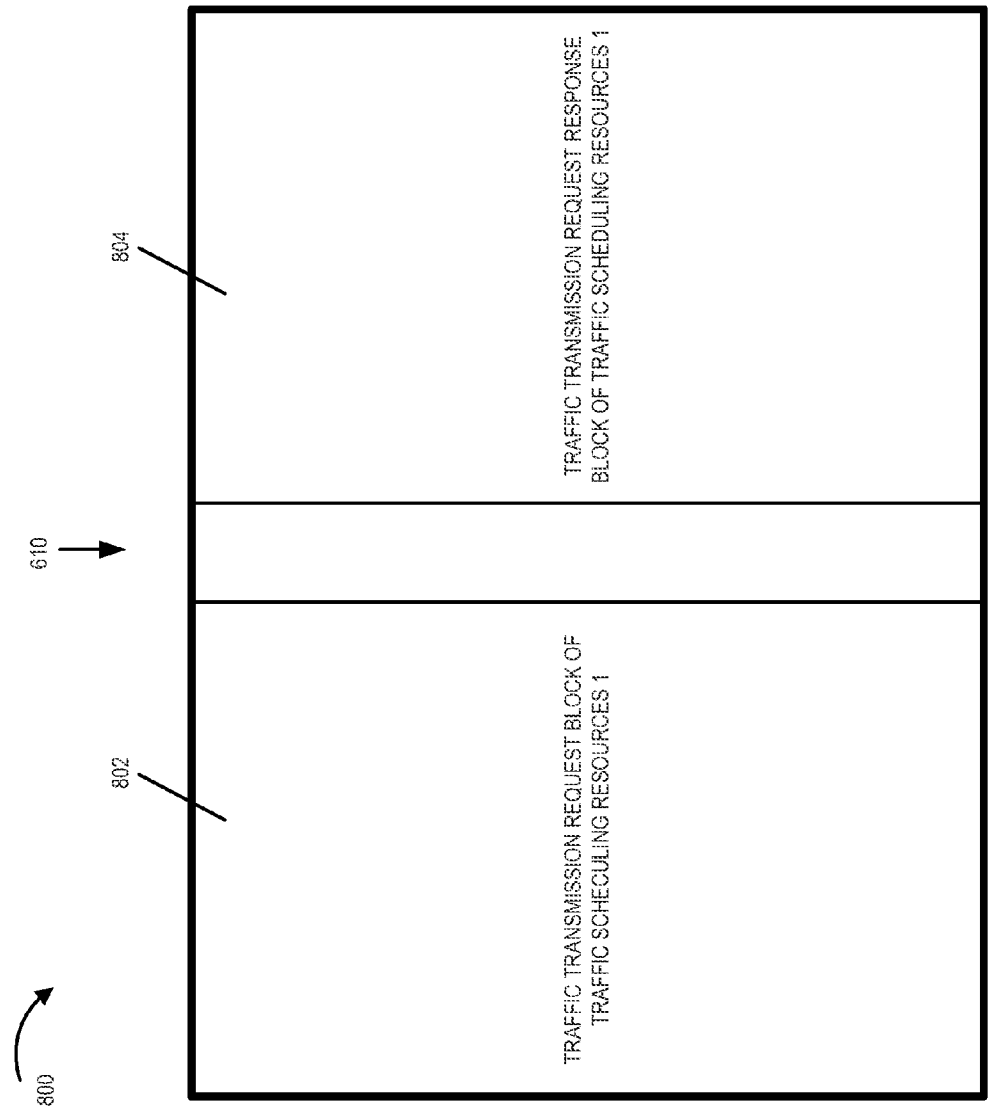
FIG. 8 is a drawing illustrating that exemplary traffic scheduling resources corresponding to first traffic data resources includes a traffic transmission request block and a corresponding traffic transmission request response block.
Figure 9:
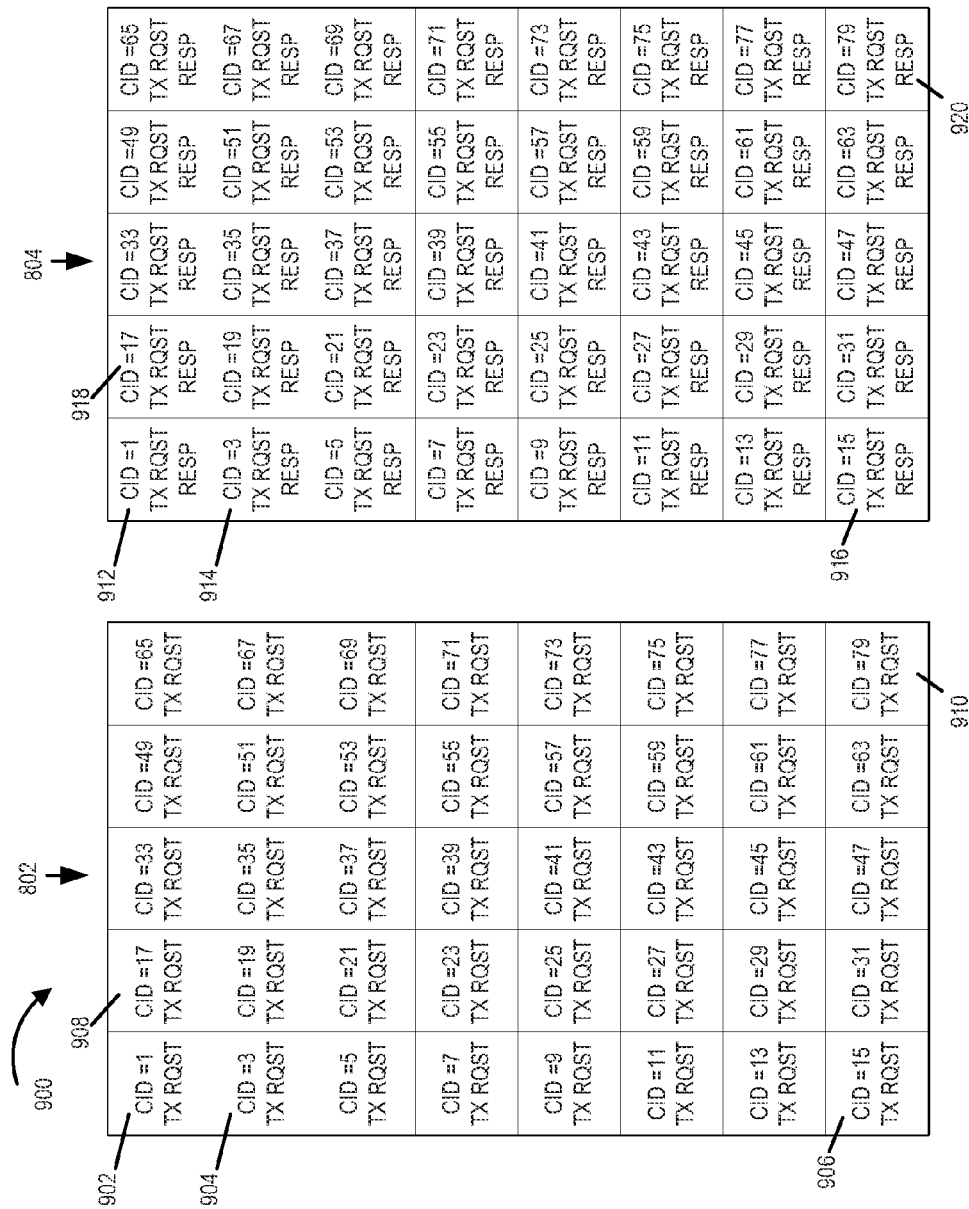
FIG. 9 is a drawing illustrating a more detailed representation of the traffic transmission request block and traffic transmission request response block of FIG. 8 in accordance with an exemplary embodiment.

FIG. 8 is a drawing 800 illustrating that exemplary traffic scheduling resources 1 610 includes a traffic transmission request block 802 and a corresponding traffic transmission request response block 804. FIG. 9 is a drawing 900 illustrating a more detailed representation of traffic transmission request block 802 and traffic transmission request response block 804. Traffic transmission request block 802 includes a traffic transmission request resource corresponding to each of the connection identifiers that may compete for transmitting peer to peer traffic signals in traffic data resources 1 612, e.g., a first traffic segment. A traffic transmission request resource corresponding to a connection identifier within traffic transmission request block 802 is, e.g., one or more tone-symbols in one or more OFDM symbols. A tone-symbol is one tone for one symbol transmission time period, where one symbol transmission time period corresponds to the time used to transmit a single OFDM symbol. In this example, each of the odd numbered connection identifiers (CID=1, CID=3, . . . , CID=77, CID=79) may compete for transmitting peer to peer traffic signals in traffic data resources 1 612. Therefore, each of the odd numbered connection identifiers (CID=1, CID=3, . . . , CID=77, CID=79) has a predetermined traffic transmission request resource within traffic transmission request block 802. In this example, there are 40 CIDs which include a traffic transmission request resource. There is a predetermined priority associated with the location of the request resources in the traffic transmission request block. In this example, a request resource with a lower time index has higher priority over a request resource with a higher time index. In addition, in this example, in a second level of priority ordering, with regard to request resources with the same time index, a request resource with a higher frequency has higher priority over a request resource with a lower frequency. For example, request resource 902 has higher priority than request resource 904 and, request resource 906 has higher priority than request resource 908. Within block 802, request resource 902 has the highest priority and request resource 910 has the lowest priority.

Traffic transmission request response block 804 includes a traffic transmission request response resource corresponding to each of the connection identifiers that may compete for transmitting peer to peer traffic signals in traffic data resources 1 612. A traffic transmission request response resource corresponding to a connection identifier within traffic transmission request response block 804 is, e.g., one or more tone-symbols in one or more OFDM symbols. In this example, each of the odd numbered connection identifiers (CID=1, CID=3, . . . , CID=77, CID=79) may compete for transmitting peer to peer traffic signals in traffic data resources 1 612. Therefore, each of the odd numbered connection identifiers (CID=1, CID=3, . . . , CID=77, CID=79) has a predetermined traffic transmission request response resource within traffic transmission request response block 804. In this example, there are 40 CIDs which include a traffic transmission request response resource. Each traffic transmission request response resource within traffic transmission request response block 804 corresponds to a traffic transmission request resource in traffic transmission request block 802. For example, traffic transmission request response resources (912, 914, 916, 918, 920) of traffic transmission request response block 804 correspond to traffic transmission request resources (902, 904, 906, 908, 910), respectively, of traffic transmission request block 802.

Figure 10:
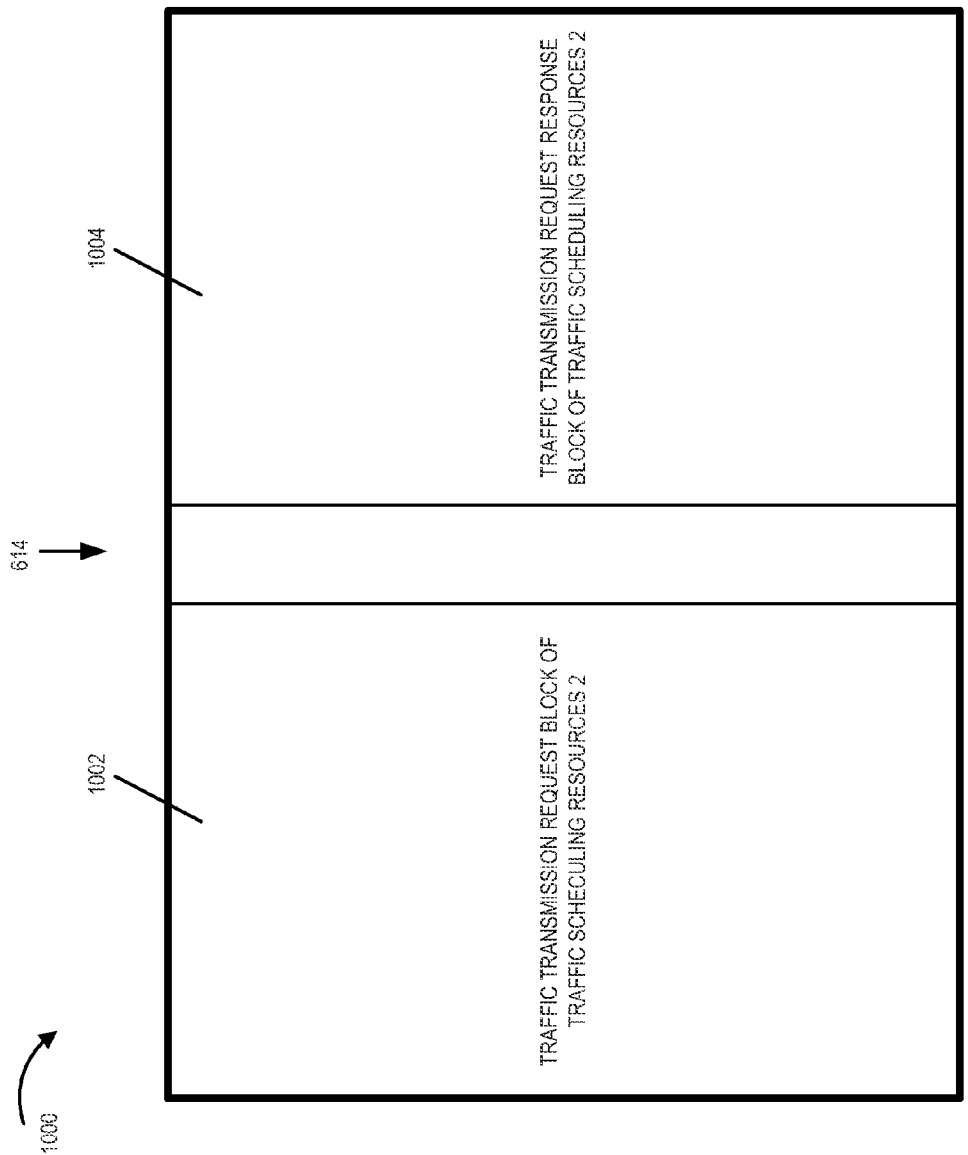
FIG. 10 is a drawing illustrating that exemplary traffic scheduling resources corresponding to second traffic data resources include a traffic transmission request block and a corresponding traffic transmission request response block.
Figure 11:
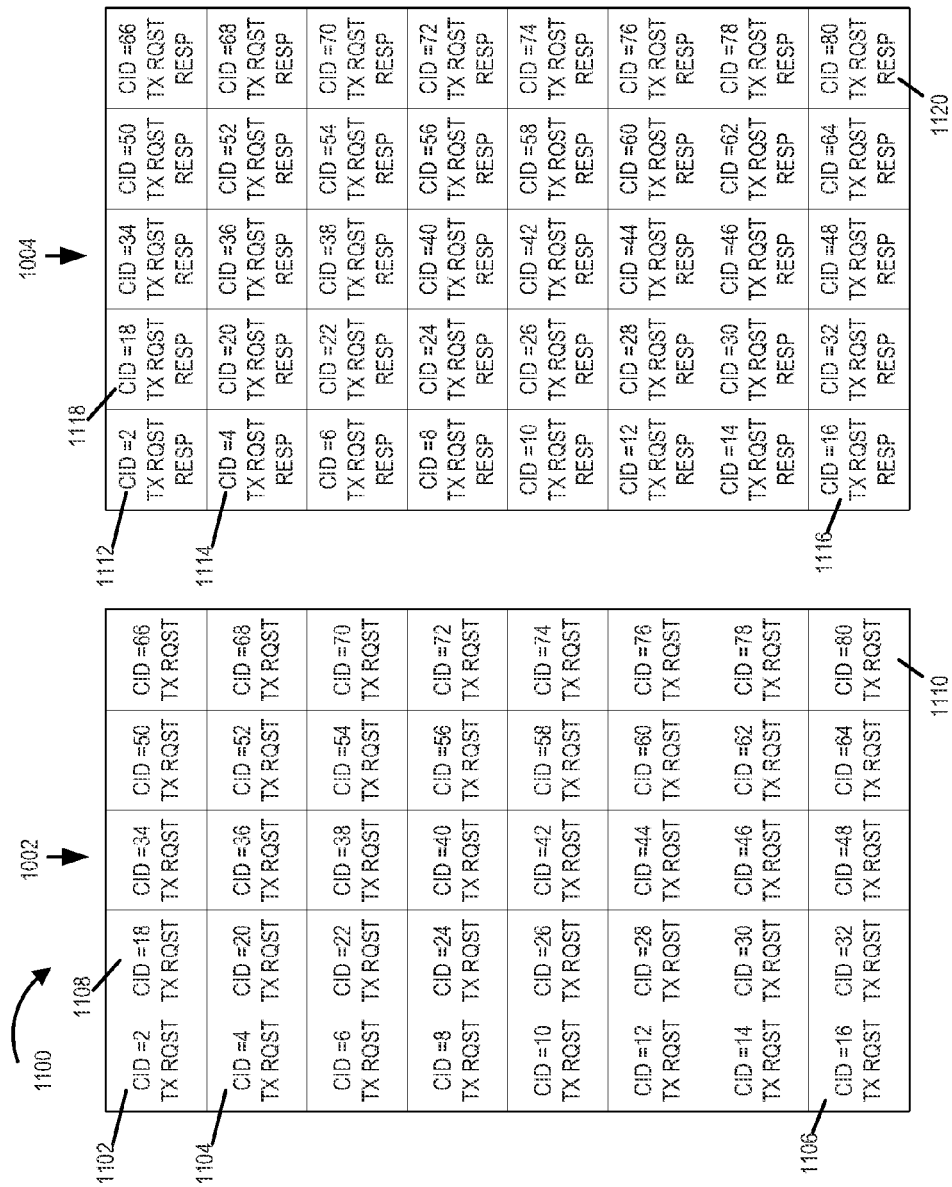
FIG. 11 is a drawing illustrating a more detailed representation of the traffic transmission request block and traffic transmission request response block of FIG. 10 in accordance with an exemplary embodiment.

FIG. 10 is a drawing 1000 illustrating that exemplary traffic scheduling resources 2 614 includes a traffic transmission request block 1002 and a corresponding traffic transmission request response block 1004. FIG. 11 is a drawing 1100 illustrating a more detailed representation of traffic transmission request block 1002 and traffic transmission request response block 1004. Traffic transmission request block 1002 includes a traffic transmission request resource corresponding to each of the connection identifiers that may compete for transmitting peer to peer traffic signals in traffic data resources 2 616, e.g., a second traffic segment. In this example, each of the even numbered connection identifiers (CID=2, CID=4, . . . , CID=78, CID=80) may compete for transmitting peer to peer traffic signals in traffic data resources 2 616. Therefore, each of the even numbered connection identifiers (CID=2, CID=4, . . . , CID=78, CID=80) has a predetermined traffic transmission request resource within traffic transmission request response block 1004. In this example, there are 40 CIDs which include a traffic transmission request resource within block 1002. There is a predetermined priority associated with the location of the request resources in the traffic transmission request block. In this example, a request resource with a lower time index has higher priority over a request resource with a higher time index. In addition, in this example, in a second level of priority ordering, with regard to request resources with the same time index, a request resource with a higher frequency has higher priority over a request resource with a lower frequency. For example, request resource 1102 has higher priority than request resource 1104 and, request resource 1106 has higher priority than request resource 1108. Within block 1002, request resource 1102 has the highest priority and request resource 1110 has the lowest priority.

Traffic transmission request response block 1004 includes a traffic transmission request response resource corresponding to each of the connection identifiers that may compete for transmitting peer to peer traffic signals in traffic data resources 2 616. In this example, each of the even numbered connection identifiers (CID=2, CID=4, . . . , CID=78, CID=80) may compete for transmitting peer to peer traffic signals in traffic data resources 2 616. Therefore, each of the even numbered connection identifiers (CID=2, CID=4, . . . , CID=78, CID=80) has a predetermined traffic transmission request response resource within traffic transmission request block 1002. In this example, there are 40 CIDs which include a traffic transmission request response resource in block 1004. Each traffic transmission request response resource with traffic transmission request response block 1004 corresponds to a traffic transmission request resource in traffic transmission request block 1002. For example, traffic transmission request response resources (1112, 1114, 1116, 1118, 1120) of traffic transmission request response block 1004 correspond to traffic transmission request resources (1102, 1104, 1106, 1108, 1110), respectively, of traffic transmission request block 1002.

Figure 12:
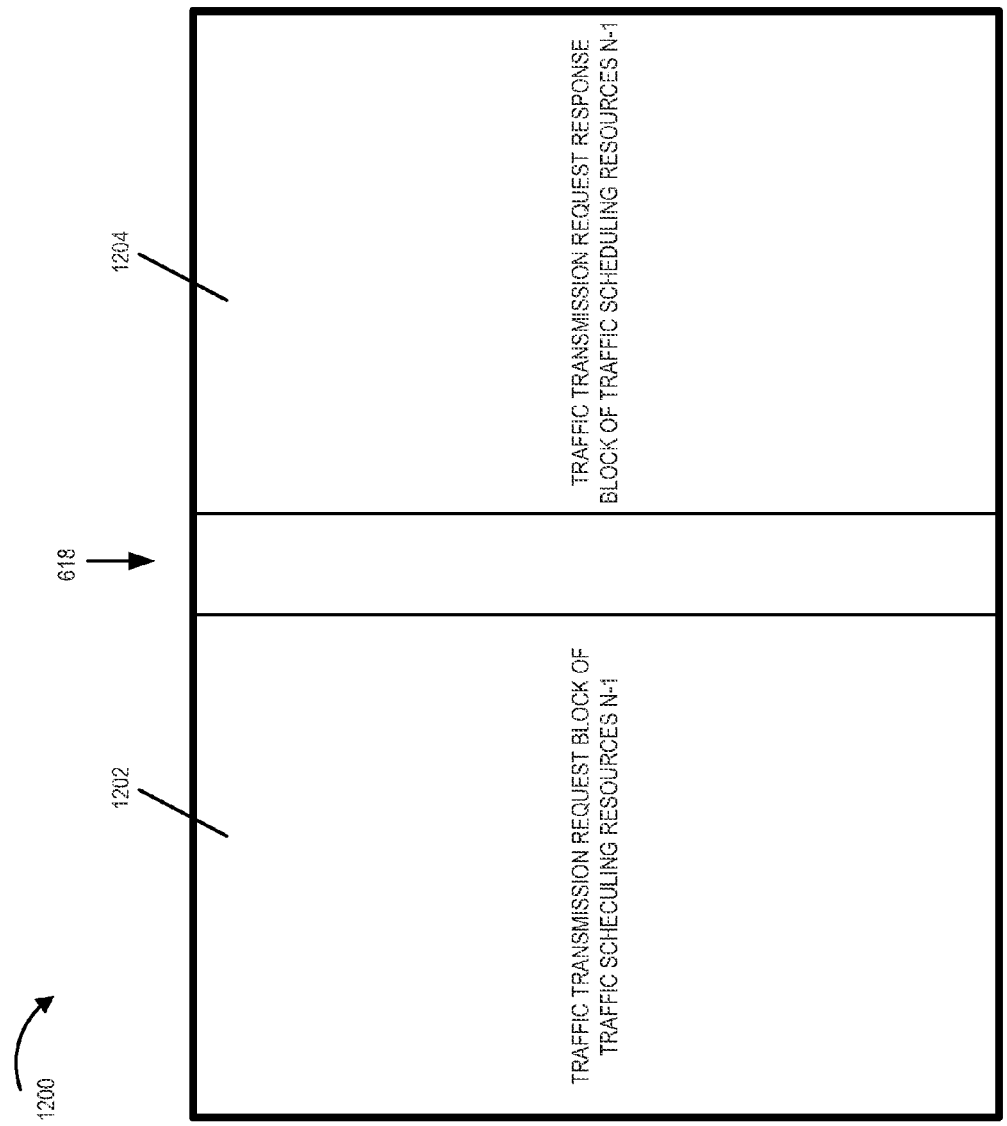
FIG. 12 is a drawing illustrating that exemplary traffic scheduling resources corresponding to (N−1) th. traffic data resources includes a traffic transmission request block and a corresponding traffic transmission request response block.
Figure 13:
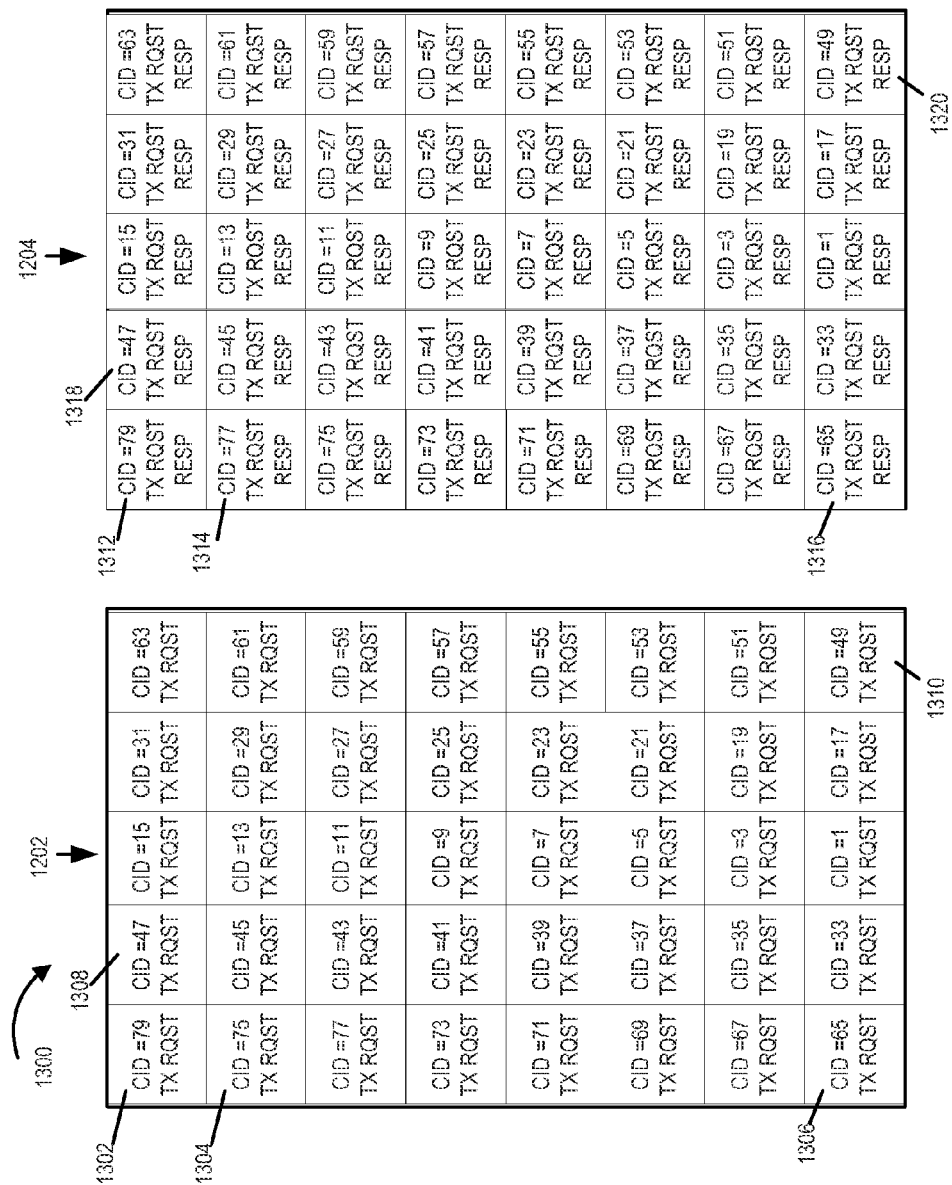
FIG. 13 is a drawing illustrating a more detailed representation of the traffic transmission request block and traffic transmission request response block of FIG. 12 in accordance with an exemplary embodiment.

FIG. 12 is a drawing 1200 illustrating that exemplary traffic scheduling resources (N−1) 618 includes a traffic transmission request block 1202 and a corresponding traffic transmission request response block 1204. FIG. 13 is a drawing 1300 illustrating a more detailed representation of traffic transmission request block 1202 and traffic transmission request response block 1204. Traffic transmission request block 1202 includes a traffic transmission request resource corresponding to each of the connection identifiers that may compete for transmitting peer to peer traffic signals in traffic data resources (N−1) 620, e.g., an (N−1)th. traffic segment. In this example, each of the odd numbered connection identifiers (CID=1, CID=3, . . . , CID=77, CID=79) may compete for transmitting peer to peer traffic signals in traffic data resources N−1 620. Therefore, each of the odd numbered connection identifiers (CID=1, CID=3, . . . , CID=77, CID=79) has a predetermined traffic transmission request resource within traffic transmission request block 1202. In this example, there are 40 CIDs which include a traffic transmission request resource. There is a predetermined priority associated with the location of the request resources in the traffic transmission request block. In this example, a request resource with a lower time index has higher priority over a request resource with a higher time index. In addition, in this example, in a second level of priority ordering, with regard to request resources with the same time index, a request resource with a higher frequency has higher priority over a request resource with a lower frequency. For example, request resource 1302 has higher priority than request resource 1304 and, request resource 1306 has higher priority than request resource 1308. Within block 1202, request resource 1302 has the highest priority and request resource 1310 has the lowest priority.

Traffic transmission request response block 1204 includes a traffic transmission request response resource corresponding to each of the connection identifiers that may compete for transmitting peer to peer traffic signals in traffic data resources N−1 620. In this example, each of the odd numbered connection identifiers (CID=1, CID=3, ..., CID=77, CID=79) may compete for transmitting peer to peer traffic signals in traffic data resources N−1 620. Therefore, each of the odd numbered connection identifiers (CID=1, CID=3, ..., CID=77, CID=79) has a predetermined traffic transmission request response resource within traffic transmission request response block 1204. In this example, there are 40 CIDs which include a traffic transmission request response resource in block 1204. Each traffic transmission request response resource within traffic transmission request response block 1204 corresponds to a traffic transmission request resource in traffic transmission request block 1202. For example, traffic transmission request response resources (1312, 1314, 1316, 1318, 1320) of traffic transmission request response block 1204 correspond to traffic transmission request resources (1302, 1304, 1306, 1308, 1310), respectively, of traffic transmission request block 1202.

Figure 14:
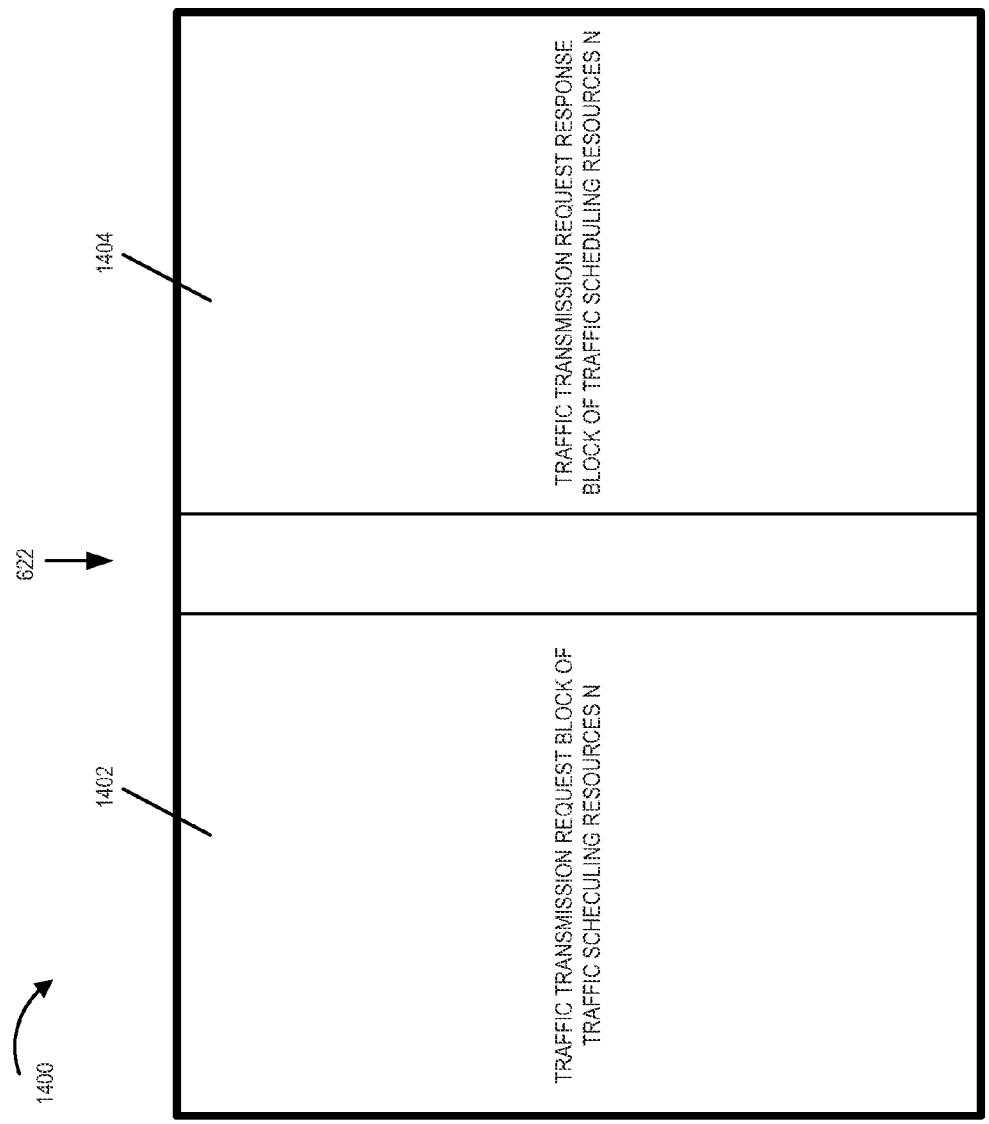
FIG. 14 is a drawing illustrating that exemplary traffic scheduling resources corresponding to Nth. traffic data resources include a traffic transmission request block and a corresponding traffic transmission request response block.
Figure 15:
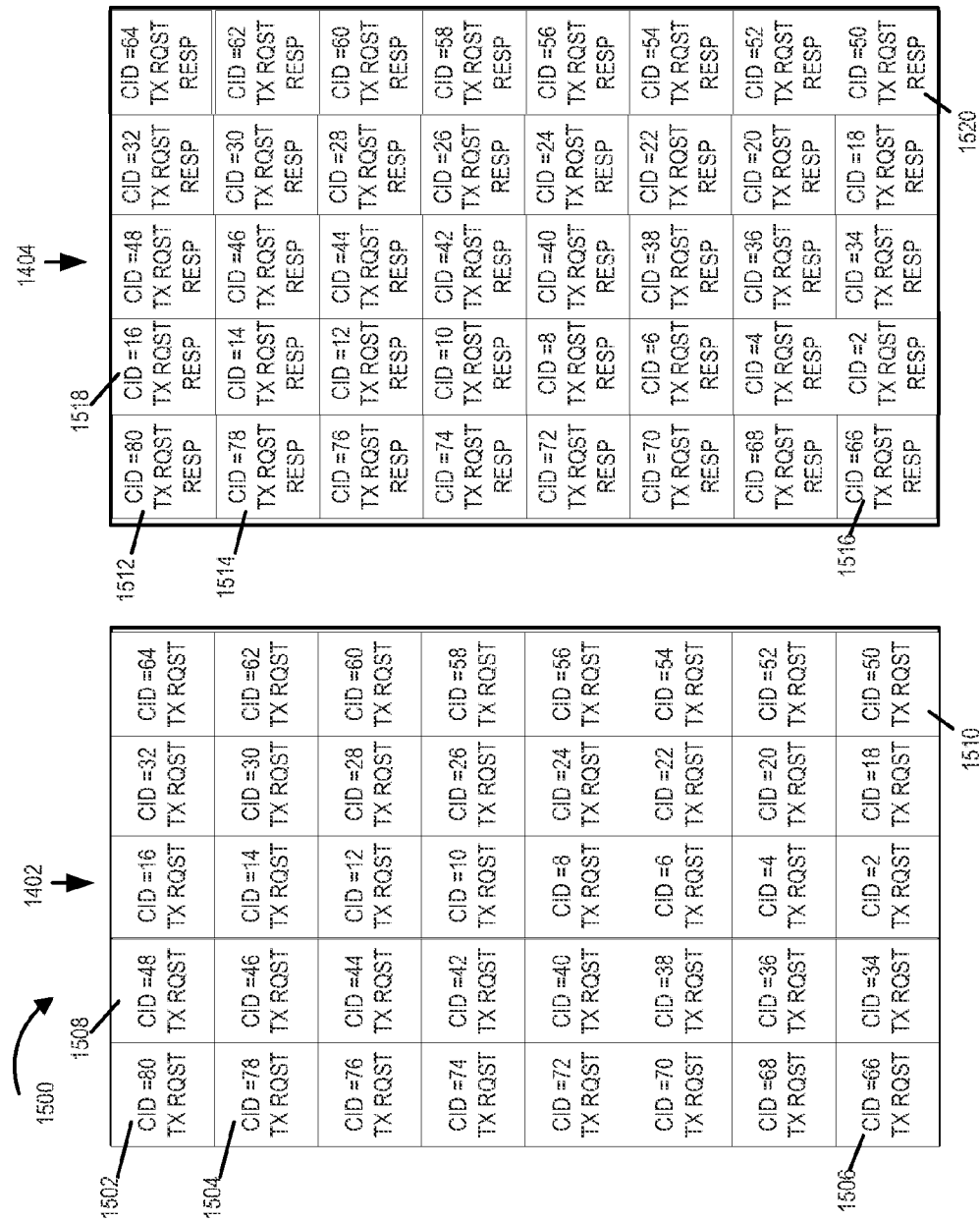
FIG. 15 is a drawing illustrating a more detailed representation of the traffic transmission request block and traffic transmission request response block of FIG. 10 in accordance with an exemplary embodiment.

FIG. 14 is a drawing 1400 illustrating that exemplary traffic scheduling resources N 622 includes a traffic transmission request block 1402 and a corresponding traffic transmission request response block 1404. FIG. 15 is a drawing 1500 illustrating a more detailed representation of traffic transmission request block 1402 and traffic transmission request response block 1404. Traffic transmission request block 1402 includes a traffic transmission request resource corresponding to each of the connection identifiers that may compete for transmitting peer to peer traffic signals in traffic data resources N 624, e.g., an Nth. traffic segment. In this example, each of the even numbered connection identifiers (CID=2, CID=4, ..., CID=78, CID=80) may compete for transmitting peer to peer traffic signals in traffic data resources N 624. Therefore, each of the even numbered connection identifiers (CID=2, CID=4, ..., CID=78, CID=80) has a predetermined traffic transmission request resource within traffic transmission request block 1402. In this example, there are 40 CIDs which include a traffic transmission request resource within block 1402. There is a predetermined priority associated with the location of the request resources in the traffic transmission request block. In this example, a request resource with a lower time index has higher priority over a request resource with a higher time index. In addition, in this example, in a second level of priority ordering, with regard to request resources with the same time index, a request resource with a higher frequency has higher priority over a request resource with a lower frequency. For example, request resource 1502 has higher priority than request resource 1504 and, request resource 1506 has higher priority than request resource 1508. Within block 1402, request resource 1502 has the highest priority and request resource 1510 has the lowest priority.

Traffic transmission request response block 1404 includes a traffic transmission request response resource corresponding to each of the connection identifiers that may compete for transmitting peer to peer traffic signals in traffic data resources N 624. In this example, each of the even numbered connection identifiers (CID=2, CID=4, ..., CID=78, CID=80) may compete for transmitting peer to peer traffic signals in traffic data resources N 624. Therefore, each of the even numbered connection identifiers (CID=2, CID=4, ..., CID=78, CID=80) has a predetermined traffic transmission request response resource within traffic transmission request response block 1404. In this example, there are 40 CIDs which include a traffic transmission request response resource in block 1404. Each traffic transmission request response resource within traffic transmission request response block 1404 corresponds to a traffic transmission request resource in traffic transmission request block 1402. For example, traffic transmission request response resources (1512, 1514, 1516, 1518, 1520) of traffic transmission request response block 1404 correspond to traffic transmission request resources (1502, 1504, 1506, 1508, 1510), respectively, of traffic transmission request block 1502.

In this example, the odd peer to peer traffic time slots in the recurring structure correspond to odd connection identifiers, and the even peer to peer traffic time slots in the recurring structure correspond to even connection identifiers. In other embodiments, the allocation of available request resources may be different, e.g., in accordance with a different predetermined mapping scheme.

In this example, the priority ordering corresponding to an individual connection identifier can, and sometimes does, change from one slot to another slot in accordance with a predetermined mapping scheme of CIDs to resources. For example, in traffic transmission request block 802 request resource 902, which has the highest priority, is mapped to CID=1, and request resource 910, which has the lowest priority, is mapped to CID=79. However, in traffic transmission request block 1202 request resource 1302, which has the highest priority, is mapped to CID=79, and request resource 1310, which has the lowest priority, is mapped to CID=49.

In traffic transmission request block 1102 request resource 1002, which has the highest priority, is mapped to CID=2, and request resource 1110, which has the lowest priority, is mapped to CID=80. However, in traffic transmission request block 1402 request resource 1502, which has the highest priority, is mapped to CID=80, and request resource 1510, which has the lowest priority, is mapped to CID=50.

In some embodiments, the hopping scheme is such that for each of the connection identifiers the average priority is substantially the same over a long time interval, e.g., over one iteration of the recurring timing structure. In some embodiments, the hopping scheme is such that for each of the connection identifiers within a subset, e.g., a subset corresponding to odd or even traffic slots, the average priority is substantially the same over a long time interval, e.g., over one iteration of the recurring timing structure.

FIGS. 16-22 illustrate an example of operating a wireless communications device in a peer to peer wireless communications system in accordance with an exemplary embodiment. The exemplary wireless communications device implements a method in accordance with flowchart 200 of FIG. 2 and/or is implemented in accordance with device 300 of FIG. 3. In the example, of FIG. 16-22 the exemplary wireless communications device detects network congestion, determines a number of resource units to acquire for traffic contention based on the level of network congestion, determines changes in levels of network congestion, makes changes in the acquired number of acquired resources for traffic contention based on detected changes in network congestion, makes changes in the relative distribution of acquired resource units for traffic contention, and changes a threshold level used in determining whether to acquire additional resource units for traffic contention, and changes a threshold level used in determining whether to release acquired resource units used for traffic contention.

Figure 16:
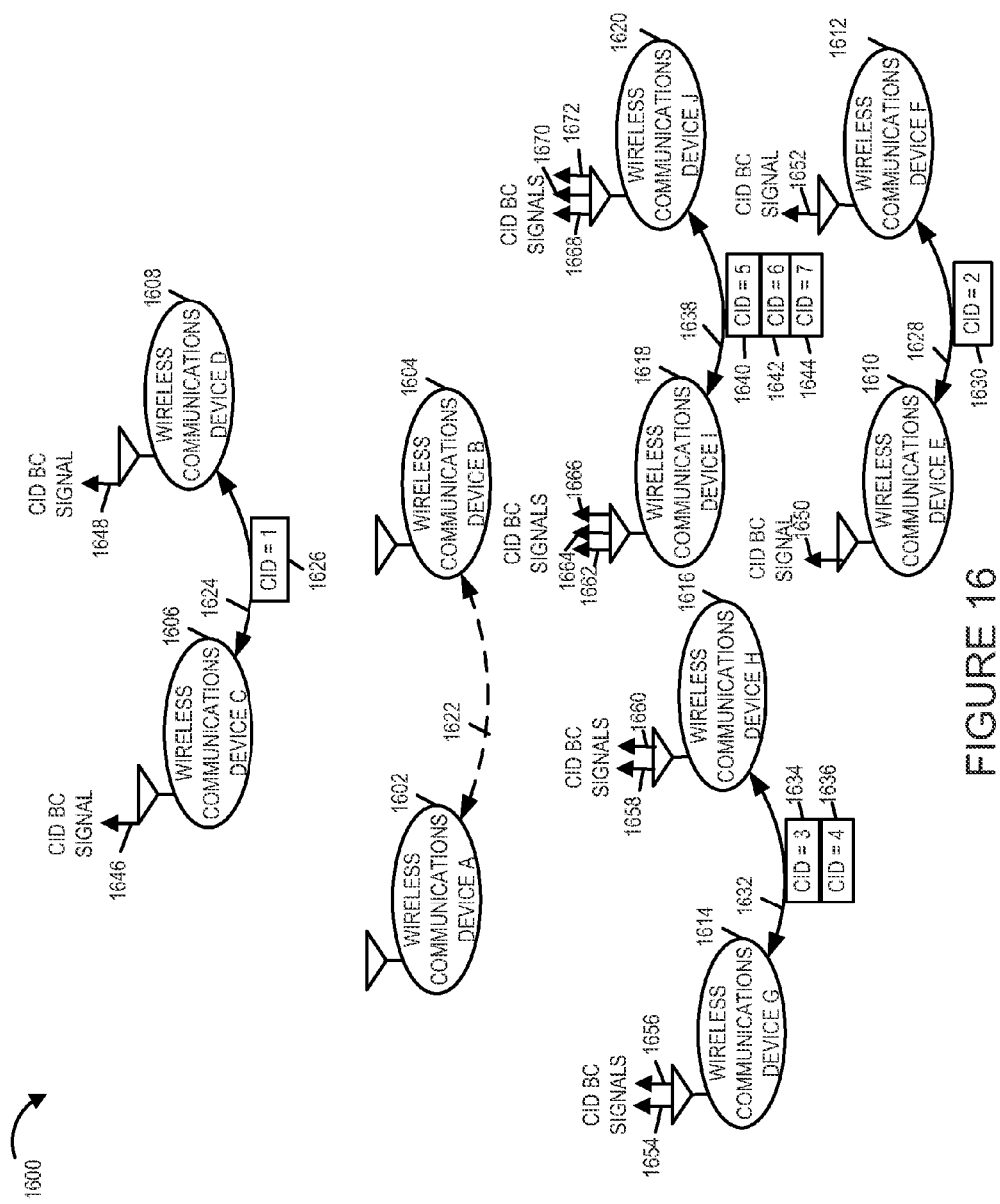
FIG. 16 illustrates: (i) exemplary wireless communications devices which have existing peer to peer connections and have already acquired one or more connection identifiers corresponding to the connection, and (ii) a pair of wireless communications devices that would like to establish a peer to peer connection and acquire one or more connection identifiers.

Drawing 1600 of FIG. 16 illustrates exemplary wireless communications devices which have existing peer to peer connections and have already acquired one or more connection identifiers corresponding to the connection. Drawing 1600 also illustrates a pair of wireless communications devices that would like to establish a peer to peer connection and acquire one or more connection identifiers. The exemplary wireless communications devices of FIG. 16 may implement a method in accordance with flowchart 200 of FIG. 2 and/or be implemented in accordance with wireless device 300 of FIG. 3. Wireless communications device C 1606 and wireless communications device D 1608 have peer to peer connection 1624 and have acquired one connection identifier, CID=1 1626. Wireless communications device E 1610 and wireless communications device F 1612 have peer to peer connection 1628 and have acquired one connection identifier, CID=2 1630. Wireless communications device G 1614 and wireless communications device H 1616 have peer to peer connection 1632 and have acquired two connection identifiers, CID=3 1634 and CID=4 1636. Wireless communications device I 1618 and wireless communications device J 1620 have peer to peer connection 1638 and have acquired three connection identifiers, CID=5 1640, CID=6 1642 and CID=7 1644.

During a CID broadcast interval, the wireless communications devices which have acquired CIDs, broadcast signals announcing that the CID is in use. Wireless communications device C 1606 generates and transmits CID broadcast signal 1646 announcing that it is using CID=1. Wireless communications device D 1608 generates and transmits CID broadcast signal 1648 announcing that it is using CID=1. Wireless communications device E 1610 generates and transmits CID broadcast signal 1650 announcing that it is using CID=2. Wireless communications device F 1612 generates and transmits CID broadcast signal 1652 announcing that it is using CID=2. Wireless communications device G 1614 generates and transmits CID broadcast signals (1654, 1656) announcing that it is using (CID=3, CID=4), respectively. Wireless communications device H 1616 generates and transmits CID broadcast signals (1658, 1660) announcing that it is using (CID=3, CID=4), respectively. Wireless communications device I 1618 generates and transmits CID broadcast signals (1662, 1664, 1666) announcing that it is using (CID=5, CID=6, CID=7), respectively. Wireless communications device J 1620 generates and transmits CID broadcast signals (1668, 1670, 1672) announcing that it is using (CID=5, CID=6, CID=7), respectively.

Wireless communications device A 1602 and wireless communications device B 1604 would like to establish peer to peer connection 1622. Wireless communications device A 1602 and wireless communications device B 1604 do not at this time have any acquired CIDs corresponding to desired peer to peer connection 1622. Wireless communications device A 1602 and wireless communications device B 1604 monitor for CID broadcast signals from other devices in their vicinity and identify which CIDs are already in use and determine a level of network congestion based on the number of CIDs in use.

Figure 17:
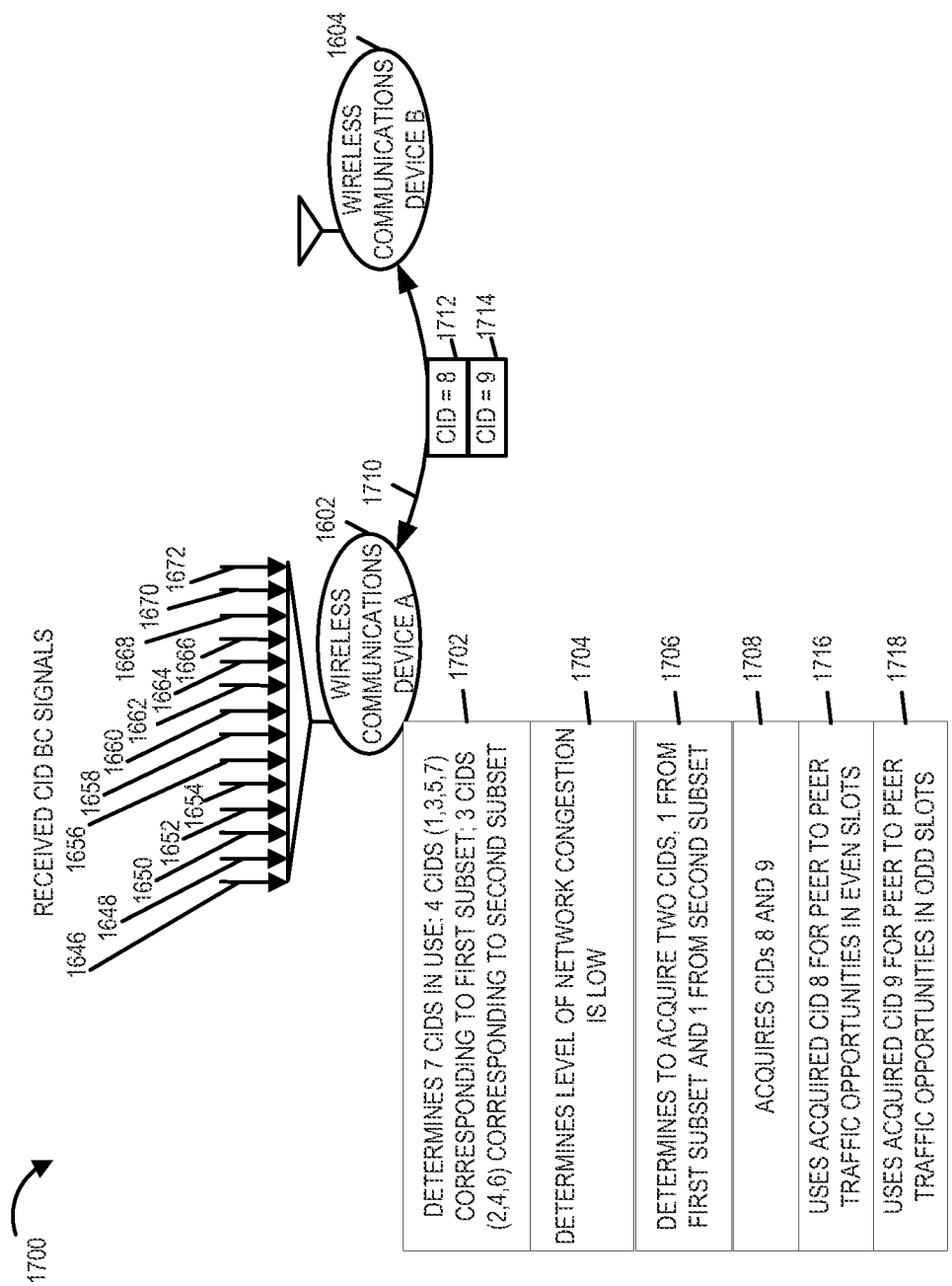
FIG. 17 illustrates an exemplary wireless device determining CIDs in use, determining a level of network congestion, and determining a number of CIDs to acquire and which CIDs to acquire based on the determined level of network congestion.

In drawing 1700 of FIG. 17, wireless communications device A 1602 receives CID broadcast signals (1646, 1648, 1650, 1652, 1654, 1656, 1658, 1660, 1662, 1664, 1666, 1668, 1670, 1672). Wireless communications device A 1602 determines that there are 7 CIDs currently in use which includes 4 CIDs (CID=1, 3, 5, 7) corresponding to a first subset and 3 CIDs (CID=2, 4, 6) corresponding to a second subset, as indicated by block 1702. Wireless communications device A 1602 determines that the level of network congestion is low, as indicated by block 1704. In some embodiments, a low level of network congestion corresponding to the determined number of CIDs in use being below a predetermined value. In some embodiments, when the determined level of network congestion is low the wireless communications device is allowed to acquire a CID from each of two different subsets corresponding to different traffic resources when establishing a new connection. In some embodiments, when the network congestion level is determined to be high the wireless communications device is allowed to acquire at most one connection identifier corresponding to one subset of traffic resources. Wireless communications device A 1602 determines to acquire two CIDs, one from the first subset and one from the second subset based on the determined level of network congestion, as indicted in block 1706. Wireless communications device A 1602 acquires CID=8 and CID=9, as indicated by block 1708. Wireless communications device A 1602 and wireless communications device B 1604 now have established peer to peer connection 1710 and have acquired CID=8 1712 and CID=9 1714.

Wireless communications device A 1602 uses acquired CID=8 for peer to peer traffic opportunities in even traffic slots in the timing structure, as indicated by block 1716. For example, wireless communications device A 1602 generates and sends a traffic transmission request signal to wireless device B 1604 on the traffic transmission request resource corresponding to CID=8 and monitors for a traffic transmission request response signal from wireless communications device B 1604 on the traffic transmission request response resource corresponding to CID=8, when wireless communications device A 1602 desires to transmit peer to peer traffic signals to device B 1602 in an even traffic slot.

Wireless communications device A 1602 uses acquired CID=9 for peer to peer traffic opportunities in odd traffic slots in the timing structure, as indicated in block 1718. For example, wireless communications device A 1602 generates and sends a traffic transmission request signal to wireless device B 1604 on the traffic transmission request resource corresponding to CID=9 and monitors for a traffic transmission request response signal from wireless communications device B 1604 on the traffic transmission request response resource corresponding to CID=9, when wireless communications device A 1602 desires to transmit peer to peer traffic signals to device B 1602 in an odd traffic slot.

Figure 18:
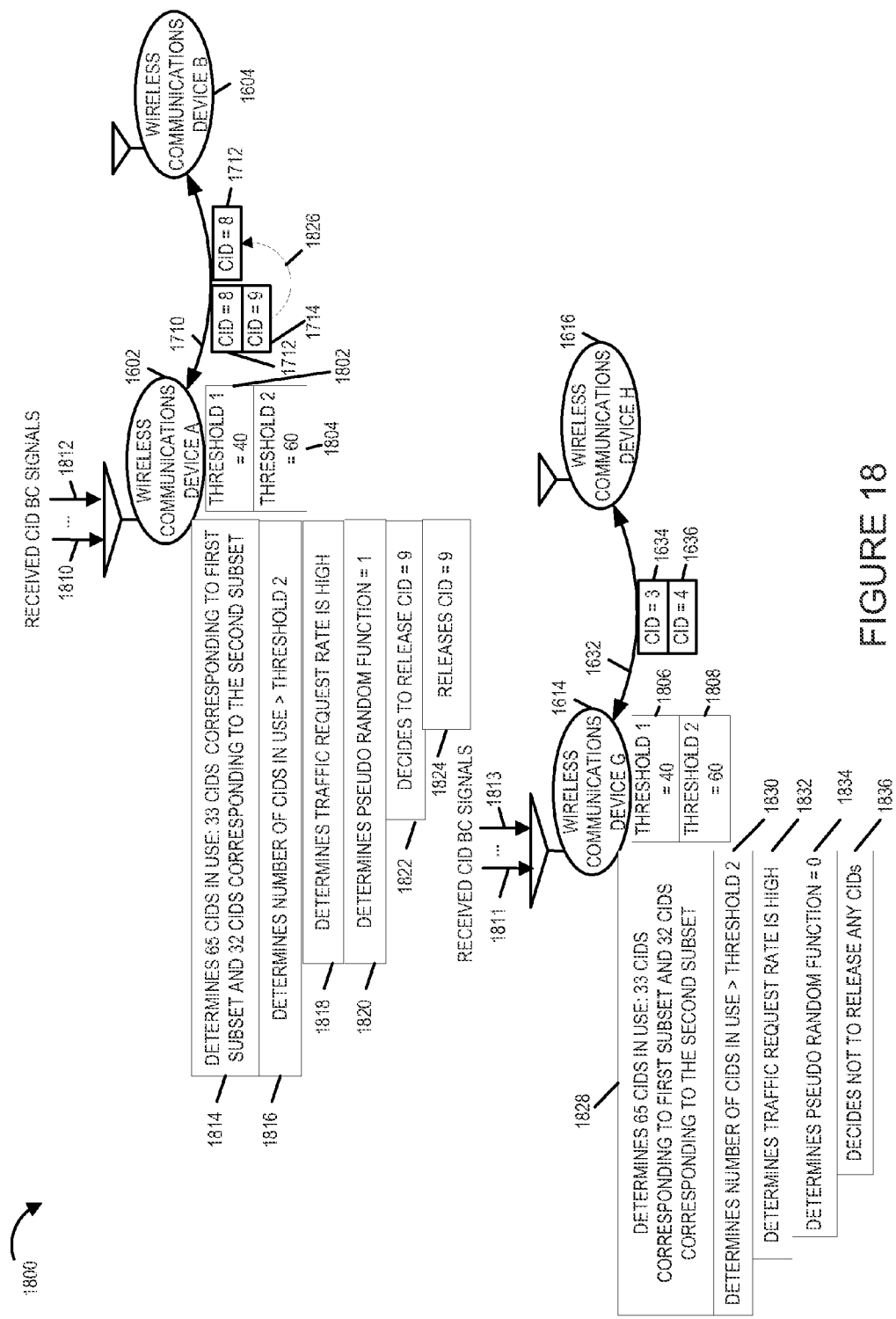
FIG. 18 illustrates two exemplary wireless devices deciding whether or not to release a CID based on: (i) a number of CIDs in use with respect to a second threshold, (ii) its traffic request rate and (iii) an output from a pseudo-random function.

Drawing 1800 of FIG. 18 illustrates a later point in time in which the network congestion has changed. Wireless communications device A 1602 detects a plurality of CID broadcast signals (1810, . . . , 1812) from other devices. Wireless communication device A 1602 has a stored threshold used in determining whether to acquire an additional CID, threshold 1, where threshold 1=40, as indicted by block 1802. Wireless communication device A 1602 has a stored threshold used in determining whether to release an acquired CID, threshold 2, where threshold 2=60, as indicated by block 1804. Wireless communications device A 1602 determines that 65 CIDs are in use and that 33 of the CIDS correspond to the first subset and that 32 CIDs correspond to the second subset, as indicated by block 1814. Wireless communications device A 1602 determines that the number of CIDs in use is greater than threshold 2, as indicated by block 1816. Wireless communications device A 1602 determines that its traffic request rate is high, as indicated by block 1818. Wireless communications device A 1602 determines that the output of its pseudo random function=1, as indicated by block 1822. Wireless communications device A 1602 decides to release CID=9, as indicated by block 1822. The decision to release a CID was based on the determination that the number of CIDs in use exceeded threshold 2 and that the output value of the pseudo random function was 1. Wireless communications device A 1602 releases CID=9 as indicted by block 1824 and dotted line arrow 1826.

Wireless communications device G 1614 detects a plurality of CID broadcast signals (1811, . . . , 1813) from other devices. Wireless communication device G 1614 has a stored threshold used in determining whether to acquire an additional CID, threshold 1, where threshold 1=40, as indicated by block 1806. Wireless communication device A 1602 has a stored threshold used in determining whether to release an acquired CID, threshold 2, where threshold 2=60, as indicated by block 1808. Wireless communications device G 1614 determines that 65 CIDs are in use and that 33 of the CIDS correspond to the first subset and that 32 CIDs correspond to the second subset, as indicated by block 1828. Wireless communications device G 1614 determines that the number of CIDs in use is greater than threshold 2, as indicated by block 1830. Wireless communications device G 1614 determines that its traffic request rate is high, as indicated by block 1832. Wireless communications device G 1614 determines that the output of its pseudo random function=0, as indicated by block 1834. Wireless communications device G 1614 decides not to release any of its acquired CIDs, as indicated by block 1836. The decision to not release a CID was based on the determination that its traffic request rate was high and that the output value of its pseudo random function was 0.

Figure 19:
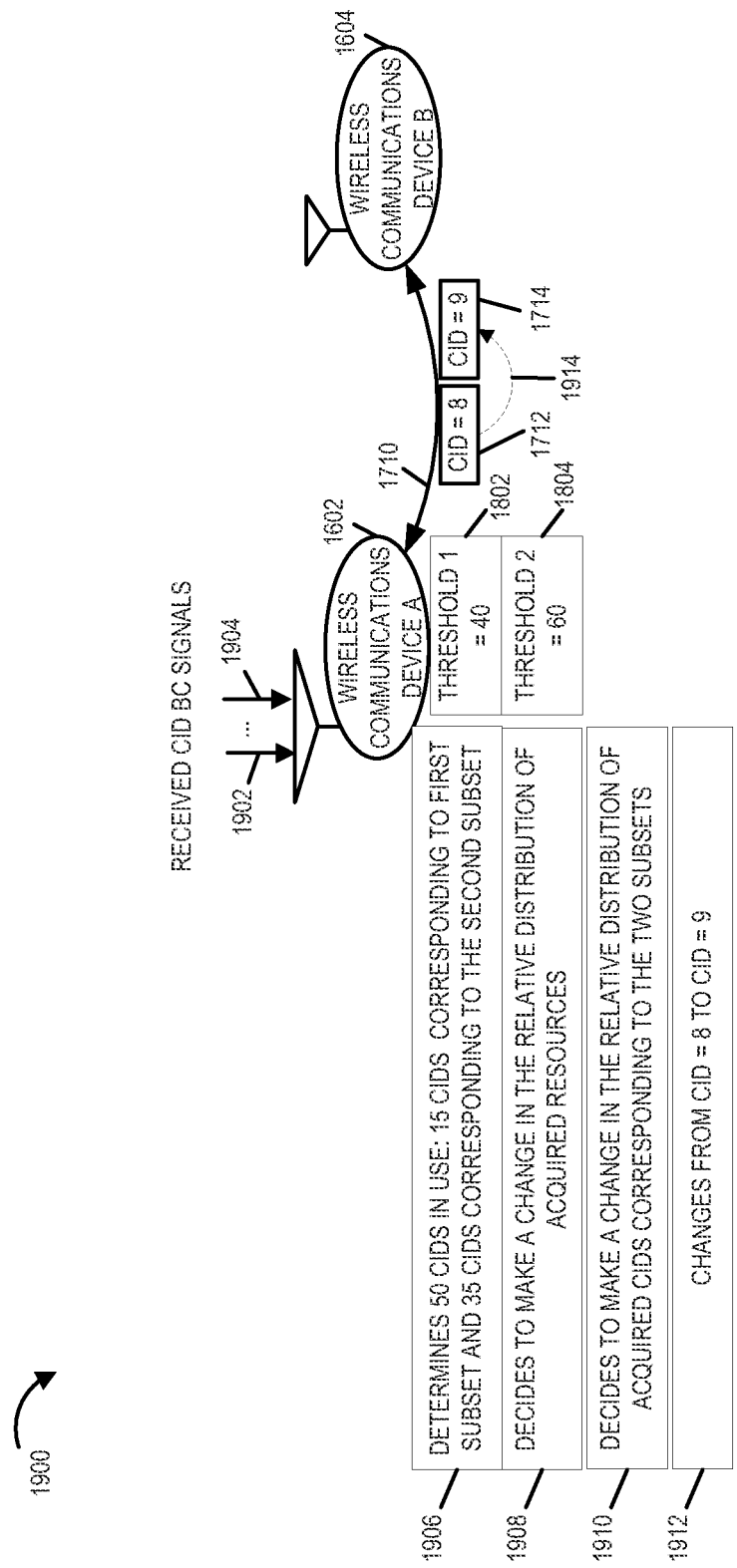
FIG. 19 illustrates an exemplary wireless device deciding to make a change in its relative distribution of acquired CIDs corresponding to two different subsets.

Drawing 1900 of FIG. 19 illustrates a later point in time in which the network congestion has changed. Wireless communications device A 1602 detects a plurality of CID broadcast signals (1902, . . . , 1904) from other devices. Wireless communications device A 1602 determines that 50 CIDs are in use and that 15 of the CIDs correspond to the first subset and that 35 CIDs correspond to the second subset, as indicated by block 1906. Wireless communications device A 1602 decides to make a change in the relative distribution of acquired resources in response to the information of block 1906, as indicated by 1908. Thus wireless communications device A 1620 decides to make a change in the relative distribution of acquired CIDS corresponding to the two subset, as indicated by block 1910. Wireless communications device A 1602 changes from CID=8 to CID=9, as indicated by block 1912 and arrow 1914.

Figure 20:
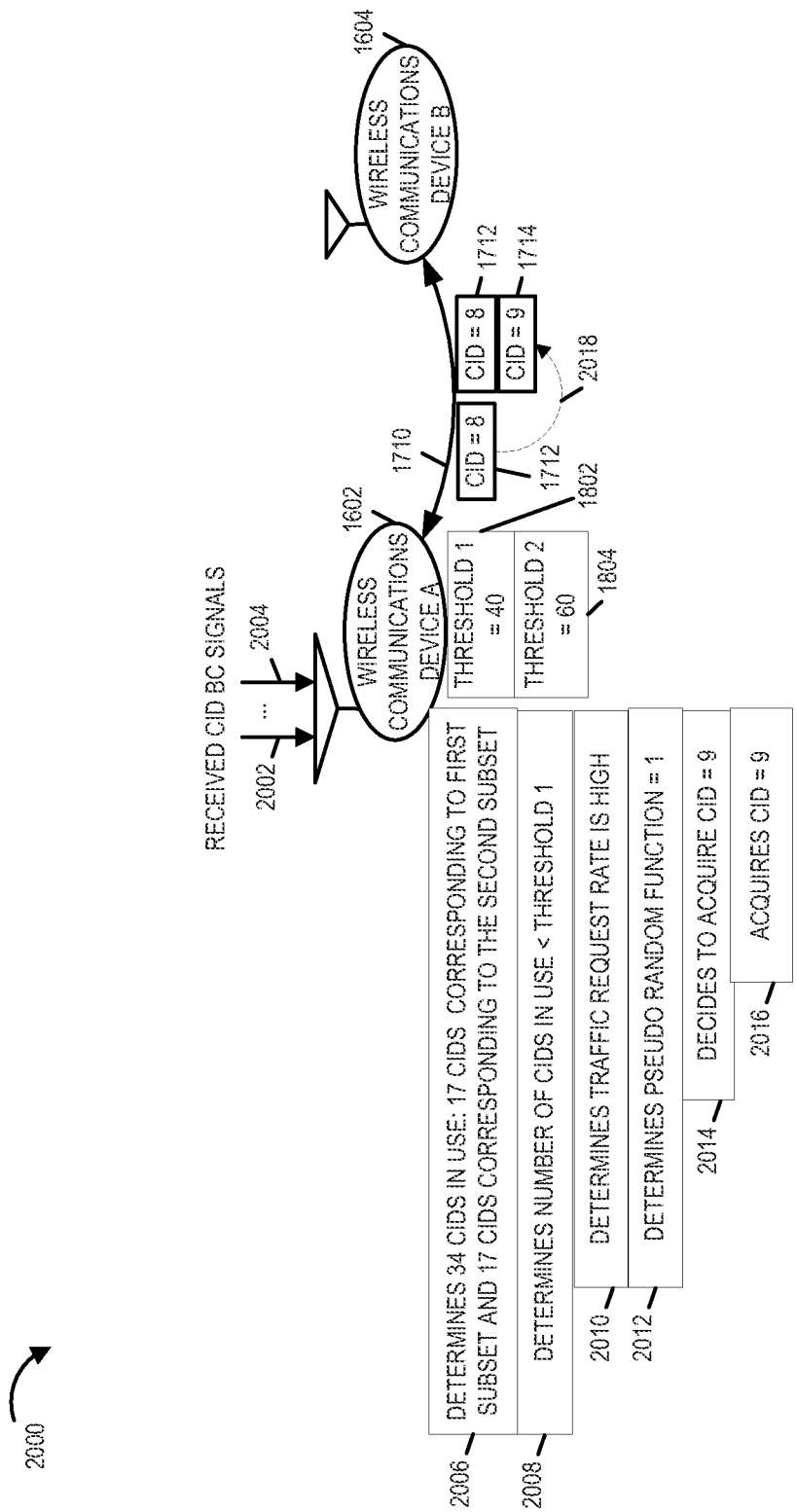
FIG. 20 illustrates an exemplary wireless device deciding whether or not to acquire an additional CID based on: (i) a number of CIDs in use with respect to a first threshold, (ii) its traffic request rate and (iii) an output from a pseudo-random function.

Drawing 2000 of FIG. 20 illustrates a later point in time in which the network congestion has changed. Wireless communications device A 1602 detects a plurality of CID broadcast signals (2002, . . . , 2004) from other devices. Wireless communications device A 1602 determines that 34 CIDs are in use and that 17 of the CIDS correspond to the first subset and that 17 CIDs correspond to the second subset, as indicated by block 2006. Wireless communications device A 1602 determines that the number of CIDs in use is less than threshold 1, as indicated by block 2008. Wireless communications device A 1602 determines that its traffic request rate is high, as indicated by block 2010. Wireless communications device A 1602 determines that the output of its pseudo random function=1, as indicated by block 2012. Wireless communications device A 1602 decides to acquire additional CID=9, as indicated by block 2014. The decision to acquire a CID was based on the determination that the number of CIDs was below threshold 1, that its determined traffic request rate was high, and that the output value of the pseudo random function was 1. Wireless communications device A 1602 acquires CID=9 as indicted by block 2016 and dotted line arrow 2018.

Figure 21:
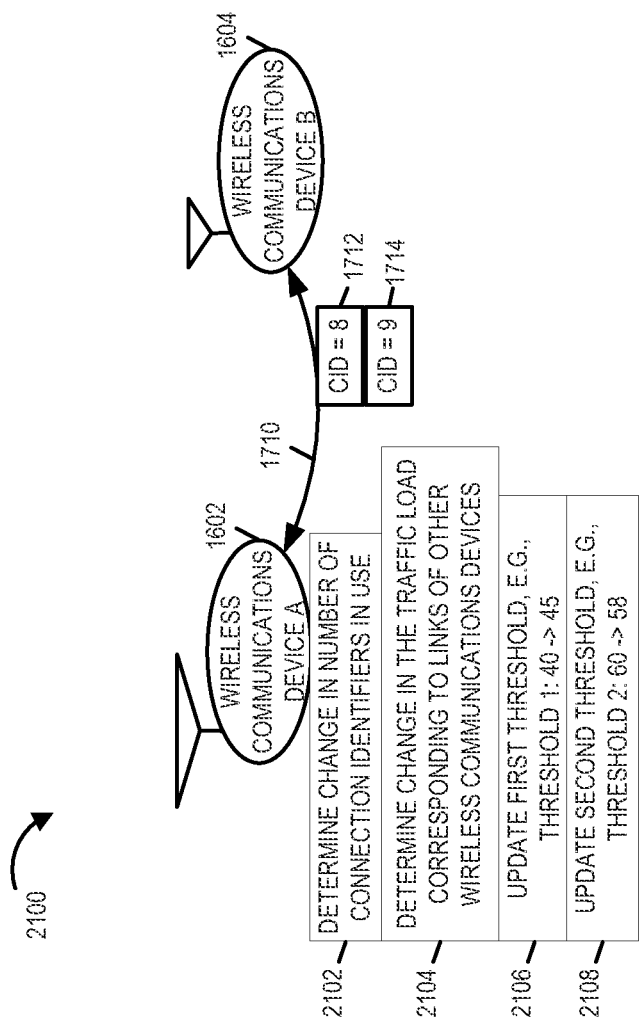
FIG. 21 illustrates an exemplary wireless device deciding to update first and second thresholds used in making decisions as to whether to acquire an additional CID or release an acquired CID.

Drawing 2100 of FIG. 21 illustrates a later point in time in which the network congestion has been observed to change over time. Wireless communications device A 1602 determines a change in the number of connection identifiers in use as indicated by block 2102. Wireless communications device A 1602 determines a change in the traffic load corresponding to links of other wireless communications devices, as indicated by block 2104. Wireless communications device A 1602 updates the first threshold, e.g., changing the value for threshold 1 from 40 to 45, as indicated by block 2106. Wireless communications device A 1602 updates the second threshold, e.g., changing the value for threshold 2 from 60 to 58, as indicated by block 2108.

In some embodiments, the opportunities to update the values of the first and second thresholds occur at a much lower rate than the opportunities to acquire an additional CID corresponding to a connection or release an acquired CID corresponding to a connection. In some embodiments, rates are different by at least a factor of 10. In some such embodiments, the rates are different by at least a factor of 100. In some embodiments, a wireless communications device determines and stores different first and second threshold values corresponding to different times, e.g., different times of the day and/or different days of the week. In some embodiments, a wireless communications device determines and stores different first and second threshold values corresponding to different locations, e.g., a work location or a residential location.

Various features and/or aspects of some embodiments, but not necessarily all embodiments, will now be described. In various embodiments, methods are implemented to decouple the CID space with the size of the traffic contention channel. In particular in some embodiments, without reducing the call block rate, the overhead incurred by traffic contention channel is reduced.

In some embodiments, each CID corresponds to resource units in traffic contention in a subset of each of the possible slots. For example, we divide the time slots into even and odd slots. A CID corresponds to a resource unit in either even or odd slots. In this approach, 50% of the CIDs are permitted to contend at each time slot, and thus the system overhead for traffic contention is reduced by 50% over the approach where a CID corresponds to a resource unit in each slot. In general, in some embodiments, different CIDs can be, and sometimes are, mapped to a different fraction of the time slots.

However, a drawback for this scheme is that for a link with one CID, it can not compete in each of the traffic slots. This can lead to a reduction of peak rate when the network is sparse, or inefficient matching at a given time slot, since with this approach a fraction of the links are permitted to compete in a slot. In some embodiments, a link is allowed to acquire more than one CID, based on the current load of the network and its traffic requirement. In particular, when a link joins the network, it first observes how occupied the CID space is. If the occupancy of the CID space is less than a threshold, e.g. 60%, the link is permitted to acquire more than one CIDs. On the other hand, if the occupancy is high, the link only acquires one CID. After the link joins the system, it will keep monitoring the congestion level of the system and it may relinquish one of its holding CIDs if the congestion level is high. The CID relinquish can be either deterministic, e.g. whenever the CID occupancy exceeds a threshold, or probabilistic, where the probability of relinquish the additional CID is chosen based on the CID occupancy level and the users duty cycle, e.g. the number of actual traffic requests sent over a given window of time slots. Links with lower duty cycle are more encouraged to relinquish their additional CID(s).

So far, we have discussed when a link should acquire multiple CIDs and when to relinquish the holding CIDs. Next we discuss which CIDs to acquire and which CID(s) to relinquish. For a new link joining the system, if it is allowed to acquire only one CID, it should pick a CID that has the least amount the contending links in the time slots corresponding to it. For any additional CIDs allowed, the link should use similar rules and that the additional CID should correspond to different time slots as compared to the CIDs it already has.

For the relinquish process, a link should first relinquish the CID which has the most amount of contention in its corresponding time slots.

Various methods and apparatus described in this application are well suited for use in wireless communications devices and networks supporting peer to peer signaling. In various embodiments a device of any of one or more of FIGS. 1-21 includes a module corresponding to each of the individual steps and/or operations described with regard to any of the Figures in the present application and/or described in the detailed description of the present application. The modules may, and sometimes are implemented in hardware. In other embodiments, the modules may, and sometimes are, implemented as software modules including processor executable instructions which when executed by the processor of the wireless communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., mobile wireless communications devices, e.g., mobile nodes such as mobile terminals, stationary wireless communications devices such as access points such as base stations, network nodes and/or communications systems. Various embodiments are also directed to methods, e.g., method of controlling and/or operating wireless communications devices such as mobile nodes and/or stationary nodes, access points such as base stations network nodes and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal reception, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a wireless communications device supporting peer to peer signaling, including a processor configured to implement one, multiple or all of the steps of one or more methods of the invention.

In some embodiments, the processor or processors, e.g., CPUs, of one or more devices, e.g., communications nodes such as wireless terminals, access nodes, and/or network nodes, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer signaling protocol. Some embodiments use an Orthogonal Frequency Division Multiplexing (OFDM) based wireless peer to peer signaling protocol, e.g., WiFi signaling protocol or another OFDM based protocol.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a wireless communications device comprising:
   identifying, by the processor, subsets of a total number of traffic resources, the subsets comprising a first subset of traffic resources and a second subset of traffic resources, the second subset of traffic resources being different from the first subset of traffic resources;
   detecting, by a processor, a level of network congestion;
   determining, by the processor, a first number of resource units to acquire from the first subset of traffic resources based on the detected level of network congestion, the first subset of traffic resources corresponding to a first set of connection identifiers; and
   determining, by the processor, a second number of resource units to acquire from the second subset of traffic resources based on the detected level of network congestion, the second subset of traffic resources corresponding to a second set of connection identifiers.

2. The method of claim 1 wherein each resource unit is associated with one or more connection identifiers which give the wireless communications device an opportunity to contend for traffic resources.

3. The method of claim 2, wherein:
   determining a first number of resource units to acquire comprises determining a first number of connection identifiers to acquire; and
   determining a second number of resource units to acquire comprises determining a second number of connection identifiers to acquire.

4. The method of claim 1, further comprising:
   making a change in the total number of acquired resource units in response to detecting a change in network congestion.

5. The method of claim 4,
   wherein detecting the change in network congestion comprises detecting a number of connection identifiers in use dropping below a first threshold indicating a decrease in network congestion below said first threshold; and
   wherein making the change in the total number of acquired resource units comprises acquiring at least one additional connection identifier upon detecting a number of connection identifiers in use dropping below the first threshold.

6. The method of claim 4,
   wherein detecting the change in network congestion comprises detecting a number of connection identifiers in use exceeding a second threshold indicating an increase in network congestion above said second threshold; and
   wherein making the change in the total number of acquired resource units comprises releasing at least one connection identifier upon detecting a number of connection identifiers in use exceeding the second threshold.

7. The method of claim 1, wherein detecting a level of network congestion includes:
   monitoring for signals indicating the use of connection identifiers; and
   determining the level of network congestion from the number of connection identifiers already in use.

8. A wireless communications device comprising:
   means for identifying subsets of a total number of traffic resources, the subsets comprising a first subset of traffic resources and a second subset of traffic resources, the second subset of traffic resources being different from the first subset of traffic resources;
   means for detecting a level of network congestion;
   means for determining a first number of resource units to acquire from the first subset of traffic resources based on the detected level of network congestion, the first subset of traffic resources corresponding to a first set of connection identifiers; and
   means for determining a second number of resource units to acquire from the second subset of traffic resources based on the detected level of network congestion, the second subset of traffic resources corresponding to a second set of connection identifiers.

9. The wireless communications device of claim 8 wherein each resource unit is associated with one or more connection identifiers which give the wireless communications device an opportunity to contend for traffic resources.

10. The wireless communications device of claim 9, wherein:
    the means for determining a first number of resource units to acquire comprises means for determining a first number of connection identifiers to acquire; and
    the means for determining a second number of resource units to acquire comprises means for determining a second number of connection identifiers to acquire.

11. The wireless communications device of claim 8, further comprising:
    means for making a change in the total number of acquired resource units in response to detecting a change in network congestion.

12. The wireless communications device of claim 11,
    wherein the means for making the change in the total number of acquired resource units comprises means for acquiring at least one additional connection identifier;
    wherein detecting the change in network congestion comprises detecting a number of connection identifiers in use dropping below a first threshold indicating a decrease in network congestion below said first threshold; and
    wherein the means for acquiring at least one additional connection identifier acquires at least one additional connection identifier upon detecting a number of connection identifiers in use dropping below the first threshold.

13. The wireless communications device of claim 11,
    wherein the means for making the change in the total number of acquired resource units comprises means for releasing at least one connection identifier;
    wherein detecting the change in network congestion comprises detecting a number of connection identifiers in use exceeding a second threshold indicating an increase in network congestion above said second threshold; and
    wherein the means for releasing at least one connection identifier releases at least one connection identifier upon detecting a number of connection identifiers in use exceeding the second threshold.

14. A computer program product for use in a wireless communications device, the computer program product comprising:
    a non-transitory computer readable medium comprising:

code for causing at least one computer to identify subsets of a total number of traffic resources, the subsets comprising a first subset of traffic resources and a second subset of traffic resources, the second subset of traffic resources being different from the first subset of traffic resources;

code for causing said at least one computer to detect a level of network congestion;

code for causing said at least one computer to determine a first number of resource units to acquire from the first subset of traffic resources based on the detected level of network congestion, the first subset of traffic resources corresponding to a first set of connection identifiers; and code for causing said at least one computer to determine a second number of resource units to acquire from the second subset of traffic resources based on the detected level of network congestion, the second subset of traffic resources corresponding to a second set of connection identifiers.

15. A wireless communications device comprising:
at least one processor configured to:
  identify subsets of a total number of traffic resources, the subsets comprising a first subset of traffic resources and a second subset of traffic resources, the second subset of traffic resources being different from the first subset of traffic resources;
  detect a level of network congestion;
  determine a first number of resource units to acquire from the first subset of traffic resources based on the detected level of network congestion, the first subset of traffic resources corresponding to a first set of connection identifiers; and
  determine a second number of resource units to acquire from the second subset of traffic resources based on the detected level of network congestion, the second subset of traffic resources corresponding to a second set of connection identifiers;
memory coupled to said at least one processor.

16. The wireless communications device of claim 15, wherein each resource unit is associated with one or more connection identifiers which give the wireless communications device an opportunity to contend for traffic resources.

17. The wireless communications device of claim 16, wherein:
  determining a first number of resource units to acquire comprises determining a first number of connection identifiers to acquire; and
  determining a second number of resource units to acquire comprises determining a second number of connection identifiers to acquire.

18. The wireless communications device of claim 15, wherein said at least one processor is further configured to:
  make a change in the total number of acquired resource units in response to detecting a change in network congestion.

19. The wireless communications device of claim 18,
  wherein detecting the change in network congestion comprises detecting a number of connection identifiers in use dropping below a first threshold indicating a decrease in network congestion below said first threshold; and
  wherein the at least one processor is configured to acquire at least one additional connection identifier upon detecting a number of connection identifiers in use dropping below the first threshold.

20. The wireless communications device of claim 18,
  wherein detecting the change in network congestion comprises detecting a number of connection identifiers in use exceeding a second threshold indicating an increase in network congestion above said second threshold; and
  wherein the at least one processor is configured to release at least one connection identifier upon detecting a number of connection identifiers in use exceeding the second threshold.

* * * * *